United States Patent
Witzens et al.

(10) Patent No.: US 10,225,018 B2
(45) Date of Patent: Mar. 5, 2019

(54) WDM COMB SOURCE BASED OPTICAL LINK WITH IMPROVED OPTICAL AMPLIFICATION

(71) Applicant: RWTH Aachen, Aachen (DE)

(72) Inventors: Jeremy Witzens, Köln (DE); Florian Merget, Würselen (DE); Juliana Mueller, Aachen (DE)

(73) Assignee: RWTH Aachen (DE)

( * ) Notice: Subject to any disclaimer, the term of this patent is extended or adjusted under 35 U.S.C. 154(b) by 0 days.

(21) Appl. No.: 15/560,751

(22) PCT Filed: Mar. 26, 2015

(86) PCT No.: PCT/EP2015/056650
§ 371 (c)(1),
(2) Date: Sep. 22, 2017

(87) PCT Pub. No.: WO2016/150522
PCT Pub. Date: Sep. 29, 2016

(65) Prior Publication Data
US 2018/0054257 A1   Feb. 22, 2018

(51) Int. Cl.
*H04B 10/50* (2013.01)
*H04B 10/296* (2013.01)
(Continued)

(52) U.S. Cl.
CPC ......... *H04B 10/506* (2013.01); *H04B 10/038* (2013.01); *H04B 10/07955* (2013.01); *H04B 10/296* (2013.01)

(58) Field of Classification Search
CPC .. H04B 10/506; H04B 10/296; H04B 10/038; H04B 10/07955
See application file for complete search history.

(56) References Cited

U.S. PATENT DOCUMENTS

| | | | |
|---|---|---|---|
| 2016/0204578 A1* | 7/2016 | Li | H01S 5/142 372/20 |
| 2017/0139236 A1* | 5/2017 | Cao | G02B 6/29338 |
| 2017/0155451 A1* | 6/2017 | Hayakawa | H04B 10/501 |

FOREIGN PATENT DOCUMENTS

| EP | 1974489 A1 | 10/2008 |
|---|---|---|
| WO | 2007084476 A1 | 7/2007 |

OTHER PUBLICATIONS

International Search Report for Application No. PCT/EP2015/056650, dated Jan. 7, 2016.
(Continued)

*Primary Examiner* — Leslie C Pascal
(74) *Attorney, Agent, or Firm* — Lerner, David, Littenberg, Krumholz & Mentlik, LLP

(57) ABSTRACT

A transmitter (TX) for a WDM optical link includes a light source (CS) generating a plurality of discrete lines (EL) with different frequencies (f), a plurality of modulators (FSM, RRM, MZM), each modulator (FSM, RRM, MZM) being configured to modulate one of the discrete lines (EL) according to a data stream ($c_1$-$c_4$), at least one optical amplifier (SOA) configured to simultaneously amplify multiple lines (EL), wherein only a subset of the generated lines (EL) is routed to the optical amplifier (SOA) resp. to each one of the optical amplifiers (SOA). A receiver (RX) for an optical link adapted to work together with the transmitter (TX) is also described. An optical link including the transmitter (TX) and/or the receiver (RX), and a method to operate said link are also described.

16 Claims, 20 Drawing Sheets

(51) Int. Cl.
    *H04B 10/038*    (2013.01)
    *H04B 10/079*    (2013.01)

(56) References Cited

OTHER PUBLICATIONS

Ibrahim, S.K., et al., Towards a Practical Implementation of Coherent WDM: Analytical Numerical, and Experimental Studies, IEEE Photonics Journal, Oct. 1, 2010, pp. 833-847, vol. 2, No. 5, IEEE, USA.
Bhooplapur, S., et al., Pul se shapes reconfigured on a pulse-to-pulse time scale by using an array of injection-locked VCSELs, Optics Letters, May 15, 2011, pp. 1887-1889, vol. 36, No. 10, Optical Society of America, USA.
Koda, N., et al., Channel selection by optical injection locking in frequency-comb based DWDM transmission, OPTO-Electronics and Communications Conference (OECC), Jul. 2, 2012, pp. 831-832, 17th, IEEE.
Akrout, A., et al., Separate Error-Free Transmission of Eight Channels at 10 Gb/s Using Comb Generation in a Quantum-Dash-Based Mode-Locked Laser, IEEE Photonics Technology Letters, Dec. 1, 2009, pp. 1746-1748, vol. 21, No. 23.
Yin, D. et al., Laser diode comb spectrum amplification preserving low RIN for WDM applications, Conference Paper in Proceedings of SPIE, Dec. 2009, 7 pages, vol. 7631, The International Society for Optical Engineering.
Zheng, Y., et al., Power-Efficient Calibration and Reconfiguration for On-Chip Optical Communication, Design, Automation & Test in Europe Conference & Exhibition (Date), Apr. 2012, 6 pages, Dresden, Germany.

* cited by examiner

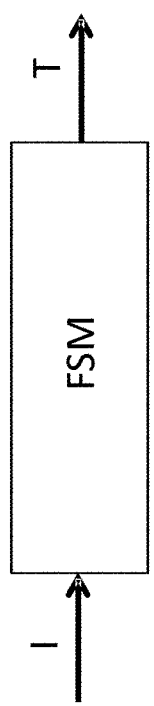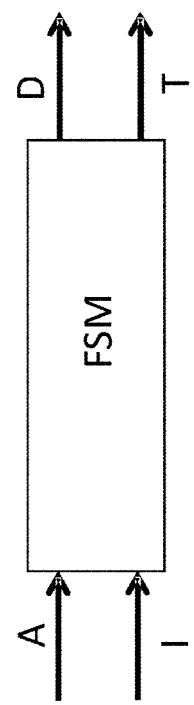

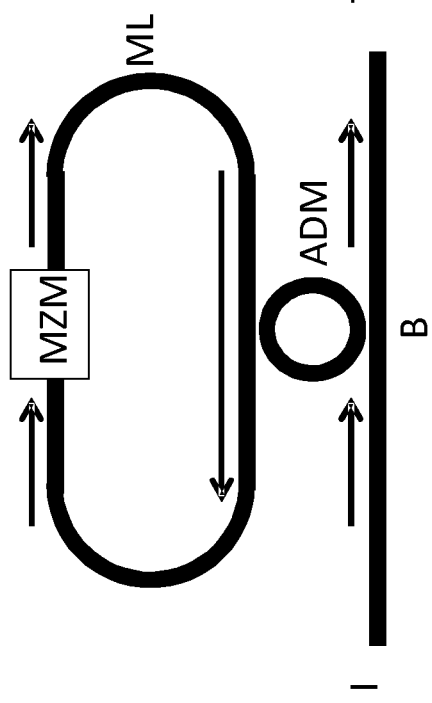
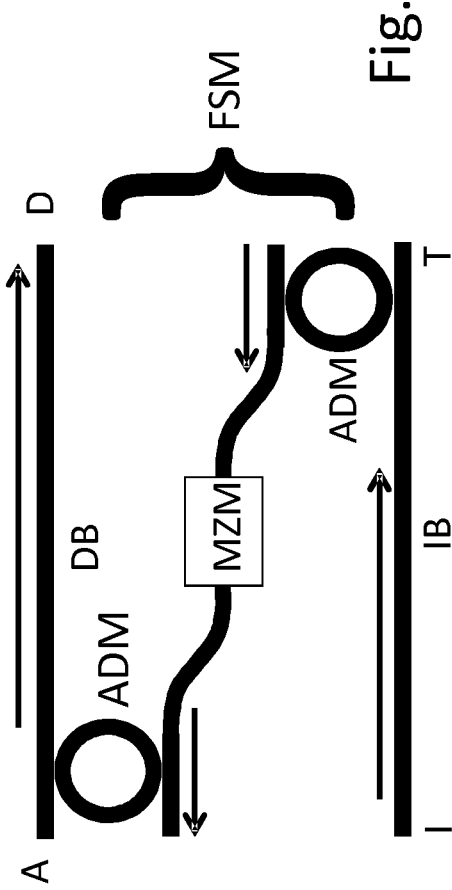

WDM COMB SOURCE BASED OPTICAL LINK WITH IMPROVED OPTICAL AMPLIFICATION

CROSS-REFERECE TO RELATED APPLICATION

The present application is a national phase entry under 35 U.S.C. § 371 of international Application No. PCT/EP2015/056650 filed Mar. 26, 2015, published in English, incorporated herein by reference.

The invention relates to a WDM optical link using a comb source as a light source, wherein optical amplifiers are used more efficiently than previously.

BACKGROUND OF THE INVENTION

In a wavelength division multiplexed (WDM) optical link, one and the same optical path between a transmitter and a receiver is used multiple times by sending multiple data channels over it using light with different frequencies. To this end, a light source generates a plurality of discrete lines with different frequencies. The lines are modulated according to a data stream separately from one another, so that each line supports an independent channel for the transmission of data. Such links are well known in the art, for example, from (A. Akrout, A. Shen, R. Brenot, F. van Dijk, O. Legouezigou, F. Pommereau, F. Lelarge, A. Ramdane, G.-H. Duan, "Separate Error-Free Transmission of Eight Channels at 10 Gb/s Using Comb Generation in a Quantum-Dash-Based Mode-Locked Laser", IEEE Photonics Technology Letters 21 (23), 1746-1748 (2009)).

If a separate laser is used to generate each line, the transmitter becomes bulky, expensive and consumes a large amount of electrical power. If a single source is used to generate all frequencies simultaneously, however, all generated lines share the limited total power of the source. Since much of the power is lost during modulation or due to interfaces between optical elements, the link budget is limited. To improve the link (e.g., to increase the range or to improve the error rate), optical amplifiers that simultaneously amplify all lines of the light are used. Examples for such amplifiers are given in (D. Yin, A. Gubenko, I. Krestnikov, D. Livshits, S. Mikhrin, A. Kovsh, G. Wojcik, "Laser Diode Comb Spectrum Amplification Preserving Low RIN for WDM applications", SPIE-OSA-IEEE 7631, 76311R-1 to 76311R-7 (2009)) as semiconductor optical amplifiers (SOAs).

The main quantities of interest regarding the quality of the link are the achievable range and the error rate. Using a SOA as an optical amplifier necessitates a trade-off regarding the power per channel. While a higher power per channel increases the achievable range and increases the signal-to-noise ratio (also in view of the excess noise generated by the SOA), which in turn improves the error rate, the signal is distorted if the amplifier is operated beyond the linear regime. If the amplifier is operated in its linear regime, however, the power per channel at the output of the SOA is limited. Moreover, there is a tradeoff between the number of jointly amplified channels and the achievable power per channel at the output of the SOA while maintaining the SOA in its linear regime, since the total output power of the SOA is limited. While amplification of an optical channel can be performed with a saturated erbium-doped fiber amplifier (EDFA) without distorting the data, EDFAs are also bulky, expensive and power hungry compared to SOAs. In the case of EDFAs or comparable erbium doped waveguide amplifiers, suboptimum amplification also leads, e.g., to increased power consumption.

Modulation of individual channels in a WDM system can be obtained by means of WDM multiplexers or by means of frequency selective modulators. A well-known problem with frequency selective modulators is, however, that their frequency of operation is generally different from the frequency of lines targeted for modulation unless they are being actively tuned. Such tuning results in additional power consumption. Methods to facilitate tuning of frequency selective modulators are well known in the art. One such method is for example described in (Y. Zheng, P. Lisherness, M. Gao, J. Bovington, S. Yang, K.-T. Cheng, "Power-Efficient Calibration and Reconfiguration for On-Chip Optical Communication," Proc. of the Design, Automation & Test in Europe Conference, 1501 to 1506, (2012)). A drawback of this method is that the free spectral range of the frequency selective modulators needs to be close to the difference between the frequencies of the highest and lowest frequency channels.

OBJECT OF THE INVENTION

It is therefore the object of the invention to improve optical amplification with an optical amplifier in a WDM link without incurring data distortion. It is a further object of the invention to reduce the power consumption of a WDM link.

DISCLOSURE OF THE INVENTION

The transmitter for an optical link comprises a light source generating a plurality of discrete lines with different frequencies and a plurality of modulators. Each modulator is configured to modulate one of the discrete lines according to a data stream. The transmitter further comprises at least one optical amplifier configured to simultaneously amplify multiple lines.

According to the invention, only a subset of the generated lines is routed to the optical amplifier resp. to each one of the optical amplifiers. The inventors have found that this can be exploited to allocate the scarce amplifier power budget better to the lines that are modulated according to a data stream. In addition, the re-routing of lines enables multiple optical amplifiers to be used.

Many sources that are suitable for generating a plurality of discrete lines simultaneously actually generate more lines than can be used for transmission of data. For example, if a comb source is used, its optical spectrum contains a set of usable lines with high power, but also many lines with a lower power that cannot support a data channel. These lines with a lower power, however, add up to a significant fraction of the total power of the source. In addition, many such sources generate more usable high power lines than are actually needed for the intended application. This problem is further exacerbated if modulators with high insertion losses, or more generally with a low maximum transmitted power level (e.g., corresponding to the "1" bit in an amplitude modulated system), are utilized, since the sum of the power of modulated lines is further reduced relative to the sum of the power of unmodulated lines, further reducing the effectiveness of amplification with a SOA of all the lines indiscriminately on whether they are modulated or not. The insertion losses of the modulators may for example be larger than 4 dB and the total power of the unmodulated lines equal to or larger than the total average power of the modulated lines after incurring the insertion losses of the modulators in an implementation relying on semiconductor mode-locked lasers and resonant ring modulators in Silicon Photonics technology. Since comb sources are very efficient sources for the generation of a plurality of discrete lines, and the invention alleviates the drawbacks to which they were previously tied, a comb source is preferably used as the light source.

Basically, all light that is not modulated according to a data stream but amplified by the optical amplifier is a waste of precious amplifier power. This will at best lead to an increased power consumption, with power expenditure associated to the amplification of unused lines. At worst, this will lead to an excessive reduction of the power of amplified lines intended to carry a data stream (due to the limited total output power of the SOA), said excessive reduction of power leading to the data being not recoverable from the modulated lines. Therefore, in a specially advantageous embodiment of the invention, the transmitter comprises means to block at least one line that is not modulated according to a data stream from being routed to the optical amplifier resp. any one of the optical amplifiers.

In a specially advantageous embodiment of the invention, the light source is a comb source, and the transmitter comprises means to block either a continuum or an infinite series of lines from being routed to the optical amplifier resp. one of the optical amplifiers. The inventors have found that if a comb source is used instead of the previous arrangements of multiple lasers, this brings about an inherent difficulty to condition the emitted light because it contains a very large number of discrete lines. In a further advantageous embodiment, those means are configured to:

allow discrete lines that are modulated according to a data stream to be routed to the optical amplifier resp. at least one of the optical amplifiers (SOA);

block either all unmodulated discrete lines, or at least unmodulated discrete lines that have an optical power of at least the power of the highest power line expressed in decibel (dB) relative to an absolute value minus a pre-set threshold value expressed in dB from being routed to the optical amplifier (SOA) resp. any one of the optical amplifiers (SOA).

For example, the threshold value can be set to 6 dB. In order to further improve the power efficiency of the optical amplifier resp. of the optical amplifiers, in a further advantageous embodiment, the threshold value can be set to 10 dB. This means that discrete lines that are not modulated according to a data stream, but have such a low optical power that they will have little impact on the amplifier power budget or on the amplifier saturation, do not need to be blocked by the means. Typically, all discrete lines that are modulated according to a data stream are allowed to be routed to the optical amplifier resp. at least one of the optical amplifiers (SOA).

The inventors have found that the following three devices are, alone or in combination, most suitable to handle this large number of lines in a way that the lines are distributed most efficiently to one or more optical amplifiers:

a chain of frequency selective modulators, wherein each of the modulators adds the line to which it is tuned to a "positive list" of frequencies that will be routed to one or more optical amplifiers, allowing to discard an infinite number of unwanted lines at once;

an optical filter with a periodic stop band that allows to block a continuum of many lines;

an interleaver that can be configured to evenly split a spectrum of very many lines into two infinite series of discrete lines that may be distributed to separate optical amplifiers to ease power constraints.

It is an inherent disadvantage that the spectrum of a source contains so many more lines than can actually be used to support data channels that it is impractical to block undesired lines one by one. Conventional means of blocking light in a continuous frequency range such as thin film filters are bulky, difficult to integrate and expensive due to hybrid assembly. Since the invention alleviates this disadvantage with devices that are straightforward to integrated inside planar photonic circuits (PLCs) and that facilitate the routing of selected lines towards modulators and towards one or more SOAs, comb sources are made more practical for use as light sources in WDM optical links. Moreover, integration of SOAs with a PLC comprising said devices suitable to handle large number of lines by means of e.g. flip-chip integration or a SOA micro-package attached onto the PLC allows integration of the SOA without interposed optical fiber in between the SOA and the PLC, reducing cost as well as the number of optical interfaces and their associated losses. Moreover, modulators and/or photodetectors can be integrated on said PLC. A receiver and a transmitter can be combined on a PLC.

A comb source is defined as an optical light source generating multiple optical comb lines coupled to a single optical waveguide, wherein at least a subset of these optical comb lines have sufficiently high power and sufficiently low relative intensity noise (RIN) to support an optical communications channel and are used as optical carriers for optical channels of the optical link. Such a comb source can for example take the form of a semiconductor mode locked laser (MLL), such as a semiconductor MLL with a saturable absorber, a single section MLL, or an actively locked semiconductor MLL. Such a comb source can also take the form of a microcavity pumped by a laser, in which microcavity light from said laser is converted into an optical comb by means of nonlinear optical processes. Optical comb lines generated by a comb source are substantially equally spaced in frequency, this frequency spacing is referred to as the free spectral range (FSR) of the comb source.

Preferably, at least one of the optical amplifiers is a semiconductor optical amplifier (SOA). A comb source may be connected to several cascaded frequency selective modulators. After the frequency selective modulators, optical channels may be amplified by a semiconductor optical amplifier (SOA) in order to maintain or enhance the link budget, wherein several optical channels are being amplified by a same SOA. The SOA is preferably operated in the linear regime or in weak saturation, so as not to excessively distort the data generated by the frequency selective modulators, as would be the case with a SOA operated in deep saturation. A common cutoff criterion for the linear regime is the 3 dB gain compression point, i.e., the maximum input power for which the SOA gain is no less than half of the small signal gain is referred to as the input power at 3 dB gain compression. The number of optical channels that can be amplified by the SOA is typically limited by the saturation output power of the SOA. A comb source typically has useful comb lines centered around a center frequency that are being utilized as optical carriers and are being modulated, as well as comb lines with frequencies further from the center frequency whose power is too low to support an optical channel, or further comb lines that cannot be amplified by the SOA due to the limited saturation output power of the SOA. Since the maximum power generated by the SOA is limited and should be optimally shared between the modulated optical carriers, it is desirable for the other comb lines to be filtered out before they reach the SOA.

The means to block at least one line may advantageously comprise an optical filter. To block many unwanted lines at once, in a specially advantageous embodiment, the optical filter comprises at least two resonators coupled to each other, so that the resonance frequencies of the resonators are broadened to form at least one continuous stop band. One advantage of such a continuous stop band is that the frequency alignment of this stop band, which depends on manufacturing tolerances and may also vary, e.g., with the temperature, can be relaxed compared to when uncoupled resonators are being used.

To the same end, the means to block at least one line that is not modulated by a data stream may comprise two resonators that are coupled either directly or via one or more common waveguides. Such a waveguide may, for example, be a common input bus or drop bus.

One possibility for filtering out undesired comb lines before the SOA is to implement an optical filter downstream of the comb source and upstream of the SOA, wherein the optical filter has at least two stop bands respectively spectrally overlapping with a low frequency portion of the optical comb and a high frequency portion of the optical comb. It is also desirable to place said optical filter upstream of the modulators modulating the optical carriers whose frequencies are closest to these stop bands, since this relaxes the precision required for the spectral alignment of the stop bands with the optical comb and relaxes the required steepness of the stop band edges.

An optical filter with periodically spaced stop bands can be implemented by a coupled resonator optical waveguide (CROW) based optical filter, further referred to as a CROW filter. Such a filter consists of several resonators either directly coupled together, or coupled together with help of an additional optical waveguide, wherein the resonant frequencies of the individual resonators are close enough to support substantial optical coupling between the resonator modes. These coupled resonators then form a higher order filter. Using it in through configuration rather than in drop configuration has the advantage that negligible optical losses are incurred in the pass bands (i.e., outside of the stop bands of the filter). On the other hand, in drop configuration light within the pass bands has to propagate through the CROW and incurs corresponding propagation losses. For the avoidance of doubt, two or more coupled resonators constitute a CROW in the context of this description. Resonators coupled within a CROW are typically bi-directionally coupled, in that light from a mode of a first resonator can couple to a mode of a second resonator and light from said mode of the second resonator can conversely couple to said mode of the first resonator. This is for example the case of two ring resonators directly coupled via evanescent coupling or via a multimode interferometer section. This is for example not the case for two ring resonators that share a common waveguide bus to which they are coupled, but without being directly coupled to each other. In that case a counterclockwise propagating mode in a first ring resonator can couple to a counterclockwise propagating mode of a second ring resonator, and a clockwise propagating mode of the second ring resonator can couple to a clockwise propagating mode of the first ring resonator. However, a counterclockwise propagating mode of the second ring resonator cannot couple to a mode of the first ring resonator and a clockwise propagating mode of the first ring resonator cannot couple to a mode of the second ring resonator, so that bi-directional coupling between two modes of the two resonators as defined above is not verified.

In a CROW based filter, the sharp resonances of individual resonators are broadened by means of the strong resonator-to-resonator coupling, forming a continuous stop band with sharp transitions. The sharpness of the transitions is given by the quality factor of the individual resonators forming the CROW filter, whereas the width of the stop band is primarily given by the resonator-to-resonator coupling strength. This way, a sharp band edge and a wide stop band can be jointly achieved. While the stop band needs to be wide enough to filter out the undesired comb lines, the edge of the stop band closest to the optical carriers needs to be sharp enough to fit within a free spectral rang (FSR) of the comb source.

In a further specially advantageous embodiment of the invention, the transmitter, especially the means to block at least one line, may comprise a cascade of frequency selective elements and/or modulators, at least one of which being configured to route one line into the optical path leading to the at least one optical amplifier resp. to at least one of the optical amplifiers, and to route the remainder of the input light to another frequency selective element and/or modulator tuned to a different frequency. For example, the frequency-selective element may be an add-drop multiplexer that selects the line and routes it to a separate modulator, where it is modulated and passed on to an optical amplifier. A modulator may be configured to perform the selection of the line and the modulation of that line according to a data stream simultaneously. If several frequency selective elements and/or modulators are cascaded, the light containing many lines may be passed from one frequency selective element to the next. Only lines that match the frequency of one of the frequency selective elements are chosen by this cascade and modulated. Preferably, this cascade may be operated in drop configuration to ensure that only modulated lines are passed to the amplifier. The remaining light can then be disposed of, e.g., in a beam dump. However, the cascade may also be operated in through configuration and combined with an optical filter that keeps the unmodulated lines from reaching the amplifier. Using a cascade of frequency selective elements brings about the advantage that the transmitter can be very flexibly reconfigured and expanded. To increase the available bandwidth for the transmission of data, further data channels may be added simply by adding one more frequency selective element or modulator to the cascade. If, on the other hand, some bandwidth is to be sacrificed in order to increase the link budget (i.e., the power per modulated line at the output of the at least one optical amplifier resp. at the output of any of the optical amplifiers), some frequency selective elements may be removed from the cascade. Separate filters are not necessary.

The link budget depends on the range, which may be a dominant issue in long-haul applications. In short-haul applications, most of the light is lost at the many optical interfaces in the system, rather than in path loss. Alignment between different optical elements is very critical to minimize losses at interfaces.

In a specially advantageous embodiment of the invention, at least one modulator is a frequency selective modulator with an input port, a through port, an add port and a drop port. This frequency selective modulator is configured to modulate at least one line provided on the input port according to a data stream and output the modulated line on the drop port, and pass all other light frequencies from the input port to the through port and from the add port to the drop port. This configuration makes cascading the modulators very easy: the drop port of one modulator can simply be coupled to the add port of the next or of the previous modulator, and the through port of one modulator can be coupled to the input port of the next modulator. Advantageously, the frequency selective modulators share two separate buses. The first bus is an input bus that enters each modulator at its input port and leaves that modulator at its through port. The second bus is a drop bus that enters each modulator at its add port and leaves that modulator at its drop port. Both buses may, for example, be implemented as waveguides.

A frequency selective modulator is an optical device with at least an optical input port and an optical through port, which may be connected to optical waveguides, wherein an optical carrier incoming from the optical input port is modulated according to an electrical signal if its carrier frequency coincides with a target frequency of the frequency selective modulator and wherein a plurality of optical carriers incoming from the input port with carrier frequencies that do not coincide with a target frequency of the frequency selective modulator are transmitted to the through port without being modulated by the frequency selective modulator. Modulated optical carriers can be sent to the through port, in which case the frequency selective modulator is referred to as being operated in through configuration, or modulated optical carriers can be sent to an additional drop port, in which case the frequency selective modulator is referred to as being operated in drop configuration. Frequency selective modulators operated in drop configuration can have a fourth optical port referred to as the add port. Light incoming from the add port having a frequency that does not coincide with a target frequency of the frequency selective modulator is simply transmitted to the drop port without being further modulated. Frequency selective modulators can also have a free spectral range (FSR), wherein an optical carrier spaced by one or several FSR from a modulated optical carrier is also modulated, whereas an optical carrier spaced by a different frequency amount from a modulated optical carrier is not modulated by the frequency selective modulator (i.e., the FSR of a frequency selective modulator is the frequency difference between its target frequencies). There is a small frequency range in which an optical carrier frequency can vary while the optical carrier is still being modulated. The width of this frequency range is referred to as the linewidth of the frequency selective modulator. When a carrier frequency coincides with a target frequency of the frequency selective modulator with a margin falling within the linewidth of the latter, the optical carrier and the frequency selective modulator are also said to be spectrally aligned.

Several frequency selective modulators each modulating a different optical carrier at a different target frequency can be cascaded one after the other to modulate more than one optical carriers with independent data streams. Frequency selective modulators operated in through configuration can be cascaded by connecting the through port of a frequency selective modulator with the input port of the next frequency selective modulator. Frequency selective modulators operated in drop configuration can be cascaded by connecting the through port of a first frequency selective modulator with the input port of a second frequency selective modulator and also connecting the drop port of the first or second frequency selective modulator with the add port of, respectively, the second or first frequency selective modulator. In this case the waveguide connecting the input and through ports of the two modulators is referred to as the input bus (or input bus waveguide) and the waveguide connecting the drop and add ports of the two modulators is referred to as the drop bus (or drop bus waveguide). Several cascaded modulators operated in drop configuration can share a common drop bus. Alternatively, subsets of cascaded frequency selective modulators operated in drop configuration can have a common input bus but more than one drop busses, wherein each subset shares a drop bus. This second configuration then also allows routing subsets of modulated optical carriers to different drop bus waveguides, combining frequency selective modulation and wavelength domain demultiplexing functionalities. In the case of cascaded frequency selective modulators operated in through configuration, the input bus waveguide is also simply referred to as the "bus waveguide", since there is no drop bus waveguide and thus no ambiguity on what is being referred to.

Advantageously, cascaded frequency selective modulators operated in drop configurations and sharing a same input bus can be subdivided into two or more groups, each group having their own drop bus. The two drop busses can be sent to two separate SOAs. The outputs of the SOAs can be recombined with an interleaver, or routed to separate optical fibers. In order to enable recombination of the two SOA outputs with an interleaver, the frequency selective modulators modulating even optical carriers can to be grouped in a first group sharing a first drop bus connected to a first SOA and the frequency selective modulators modulating odd optical carriers have to be grouped in a second group sharing a second drop bus connected to a second SOA.

Cascaded frequency selective modulators can also be subdivided into more than 2 groups each sharing a drop bus waveguide connected to an individual SOA. Since it is more difficult to recombine more than two SOA outputs into a single waveguide, SOA outputs can for example each be sent to individual fibers or individual fiber cores, or SOA outputs can first be paired with interleavers before being sent to individual fibers or to individual fiber cores.

The frequency selective modulator may be a resonant ring modulator (RRM). This implements the frequency selective element and the modulator in one single component, which reduces losses induced by the transition of the light between multiple components and reduces the number of frequency selective devices that need to be tuned.

The frequency selective modulator may also be a Mach-Zehnder modulator coupled to the input port and to the through port by a first resonant add-drop multiplexer (ADM), or by a first parallel configuration of multiple resonant add-drop multiplexers (ADM) tuned to different frequencies, and coupled to the drop port and to the add port by a second resonant add-drop multiplexer (ADM), or by a second parallel configuration of multiple resonant add-drop multiplexers (ADM) tuned to different frequencies. Such modulators are more complicated than resonant ring modulators (RRM), but also more flexible: If parallel configurations of multiple resonant add-drop multiplexers (ADM) are used, and the frequencies to which the add-drop multiplexers (ADM) are tuned correspond to discrete lines, one and the same modulator may be used on any one of the lines to which one of the add-drop multiplexers (ADM) is tuned. It is not necessary that all parallel add-drop multiplexers stay tuned to carrier frequencies (lines) of data channels. Rather, the frequency selective modulator may be optically reconfigured by tuning only one of the add-drop multiplexers to a carrier frequency (line) of a data channel, while tuning the other multiplexer to a frequency that does not correspond to any carrier frequency (line). That other multiplexer is then effectively disabled. As described below such a configuration may be used to compensate for fabrication variability of the add-drop multiplexers while reducing the power consumption associated to said compensation. Usually, only one add-drop multiplexer (ADM) out of a group of such multiplexers is tuned to a carrier frequency (line) of a data channel.

A frequency selective modulator can take the form of a resonant ring modulator (RRM) coupled to a bus waveguide with an input and a through port. A frequency selective modulator can further take the form of a resonant ring modulator (RRM) coupled to an input bus waveguide with an input and a through port and coupled to a drop bus waveguide with an add and a drop port. A frequency selective modulator can also take the form of a lumped element, segmented or travelling wave Mach-Zehnder modulator (MZM) coupled to a bus waveguide with a resonant ADM such as a ring resonator ADM. A frequency selective modulator can further take the form of a MZM coupled to an input bus waveguide with a resonant ADM, said input bus waveguide having an input and a through port, and the MZM being further coupled to a drop bus waveguide with a second ADM, said drop bus waveguide having an add port and a drop port. Frequency selective modulators can be actively tuned to spectrally align a target frequency with an optical carrier frequency or to spectrally misalign target frequencies from optical carrier frequencies.

A possibility to filter out undesired comb lines is to use frequency selective modulators in drop configuration and connecting a drop bus to the SOA. In this case the filtering occurs naturally, since the undesired comb lines remain in the input bus and are thus not routed to the SOA. In other words, cascaded frequency selective modulators operated in drop configuration combine a filter functionality with the modulation functionality.

In order for the frequency selective modulators to modulate a single optical carrier, it is desirable for the free spectral range (FSR) of the frequency selective modulators to be larger than the difference between the frequencies of the highest frequency and the lowest frequency optical carrier. An optical filter can be implemented in the form of an optical filter having multiple stop bands (corresponding to frequency ranges being filtered out) separated by a free spectral range. In this case, the FSR of the optical filter also needs to be larger than the difference between the frequencies of the highest frequency and the lowest frequency optical carrier.

Implementation of the optical filter as a CROW based filter is particularly elegant here, since the CROW filter can be implemented with similar resonators as also used in the frequency selective modulators (e.g., for resonant ring modulators (RRMs), or for the resonant ADMs used jointly with a Mach-Zehnder Modulator (MZM)), guaranteeing that a technology supporting a sufficient free spectral range (FSR) for the CROW filter also results in a sufficient FSR for the frequency selective modulators. Moreover, the linewidth of the frequency selective modulators also typically depends on the quality factor of resonators constituting the frequency selective modulator, and the linewidth has to be smaller than the FSR of the comb source. Since the sharpness of the stop band edge of the CROW filter also depends on the quality factor of its constituting resonators, the sharpness of the stop band edge can be made sufficient to fall within a FSR of the comb source by using a similar resonator type. Similar resonator type may for example refer to the fact that both RRMs or the resonant ADMs forming the frequency selective modulators and the CROW filter comprise ring resonators fully or partially etched in the silicon device layer of a same SOI chip.

Frequency selective modulators typically comprise a resonator. For example, RRMs are based on a ring resonator. Other types of frequency selective modulators described here, such as frequency selective modulators comprising a MZM and at least one resonant ADM, also comprise a resonator within the resonant ADM. Thus, either filtering schemes described here, a CROW filter or filtering by selective coupling to a drop waveguide via cascaded frequency selective modulators, may rely on at least one resonator coupled to an input bus waveguide. Moreover, since a CROW filter comprises more than one resonator coupled to each other, and since an array of more than one frequency selective modulators also comprises more than one resonator, both preferred filter implementations described here comprise more than one resonator. This is consistent with the fact that the filtering functionality required here cannot be implemented with a single resonator since the trade-off between the filter stop band width and the sharpness of the stop band edge arising from the Lorentzian line shape of a single resonance is not acceptable. In the case of strongly bi-directionally coupled resonators, the resonance is broadened with a flat-top transfer function, making individual tuning of resonators constituting the filter less critical. In the case of weakly coupled or not bi-directionally coupled resonators, the transfer function of the filter is given by juxtaposition of the transfer function of the individual resonators, typically making individual tuning of the resonators a requirement in order to compensate for fabrication variability. Since individual tuning of resonators results in excess power consumption, it is desirable to use the same set of resonators for both modulation and filtering.

In a further advantageous embodiment of the invention, the transmitter, especially the means to block at least one line, may comprise an interleaver configured to route a first subset of the incoming lines to a first optical amplifier and to route a second subset of the incoming lines to a second optical amplifier. For example, in an indexed sequence of lines ordered by frequency, the interleaver may be configured to route lines with an odd index to the first optical amplifier and to route lines with an even index to the second optical amplifier.

Even if all lines eventually reach an optical amplifier, i.e., if lines that are not modulated according to a data stream are not blocked from being routed to an optical amplifier, distributing the total power among two or more optical amplifiers already alleviates the saturation problem by a great deal. However, this redistribution of the lines may also be used in combination with optical filtering, a cascade of frequency selective elements, or a cascade of frequency selective modulators.

Since the number of channels supported by the link may be limited by the output power of the SOA, it might be necessary to use more than one SOA in the link and to distribute the optical channels between the SOAs. This splitting can for example be done with an interleaver routing optical carriers to one out of two SOAs. The interleaver is defined as a three port device with ports A, B and C that distributes lines (carriers) arriving on the input port A among output ports B and C. It may be configured in a way that every second optical carrier (as ordered by frequency) entering port A is sent to port B (the even optical carriers), and every other optical carrier entering port A is sent to port C (the odd optical carriers). Conversely, even optical carriers entering port B, as well as odd optical carriers entering port C, are sent to port A. An interleaver can be used to send even optical carriers to a first SOA and odd optical carriers to a second SOA, wherein port B of the interleaver is connected to the input port of the first SOA and port C of the interleaver is connected to the input port of the second SOA. The outputs of the two SOAs can then be recombined with a second interleaver, wherein port B of the second interleaver is connected to the output of the first SOA and port C of the second interleaver is connected to the output of the second SOA. Port A of this second interleaver can then be directly or indirectly routed to an optical fiber providing connectivity to a receiver. Alternatively, the output ports of the two SOAs can be routed to separate optical fibers without first being recombined. An interleaver can for example be implemented as an imbalanced Mach-Zehnder Interferometer with a directional coupler or with a 2 by 2 multimode interferometer used as one of the combiners.

The optical link according to the invention comprises a transmitter as described herein. The signal transmitted from this transmitter may be sent to a receiver, for example, via a direct line of sight or via an arrangement of mirrors. It may also be routed to a receiver via an optical fiber. Most of these fibers are not polarization maintaining. Polarization maintaining fiber is much more expensive, and the angular alignment of such fiber (alignment of the slow and fast axis relative to the optical elements of the photonic chips) also results in much more costly assembly processes. Even if a fiber is nominally polarization maintaining, the polarization will be mixed to a certain degree, depending, for example, on the length of the fiber and on the stability of the environmental conditions (especially the temperature) along the path of the fiber, or on the precision of the alignment of the polarization maintaining fiber's slow and fast axis relative to the transmitter and receiver.

To make best use of all light arriving at the receiver even if the polarization is mixed, the inventors have developed a polarization insensitive receiver for an optical link. In a specially advantageous embodiment of the invention, the optical link comprises such a receiver. The receiver is configured to decode at least one data stream from an optical signal transmitted by a transmitter as described herein, comprising a polarization splitting element with one input port and two output ports, at least one resonant add-drop multiplexer tuned to at least one line modulated according to a data stream, and at least one detector to convert a light intensity into an electrical signal.

According to the invention, light from the two output ports of the polarization splitting element is coupled into the resonant add-drop multiplexer in opposite directions, and light is coupled from the resonant add-drop-multiplexer to the at least one detector in two opposite directions.

The inventors have found that in this configuration, one and the same add-drop multiplexer can be used to route the light corresponding to one line to a detector, irrespective of the polarization state of this light. In designs according to the prior art, light from each of the two output ports of the polarization splitting element was routed to a separate set of add-drop multiplexers for the different lines carrying the data channels. Thus, the configuration according to the invention cuts the required number of add-drop multiplexers in half. This makes the receiver less bulky and also reduces power consumption of the receiver.

The light that is coupled from the resonant add-drop multiplexer in two opposite directions can be routed to two separate input ports of one and the same detector, for example, by coupling the light from the add-drop multiplexer into a loop and connecting each end of this loop to one input port of the detector. The polarization state of the light then only determines in which direction it will propagate along the loop. The light may, however, also be routed to two separate detectors, and the signals of those two detectors may be combined in the electrical domain.

In a specially advantageous embodiment of the invention, multiple add-drop multiplexers are coupled to a common waveguide that forms part of an optical path between the two output ports of the polarization splitting element. This optical path may, for example, be in the shape of a loop. However, this path or loop may also be branched, for example, by the introduction of phase splitting elements. Irrespective of its polarization state, all light that enters the polarization splitting element is passed along all of the add-drop multiplexers. The polarization state only determines the direction of propagation. From the common waveguide, each add-drop multiplexer picks light components that match the line to which it is tuned.

In a further advantageous embodiment of the invention, light from multiple add-drop multiplexers may be coupled to the same detector or set of detectors. These multiple add-drop multiplexers then form a parallel configuration of multiple add-drop multiplexers. That detector is then made sensitive to either one of the lines to which the add-drop multiplexers are tuned. By tuning one of those add-drop multiplexers to a line sent from the transmitting end of the link, the receiver can thus be optically re-configured to use one specific add-drop multiplexer to couple light to said detector or set of detectors.

A fiber receiving light from the transmitter described above may be routed to a receiver. If this fiber is not polarization maintaining, light is split in the receiver according to its polarization into two waveguides. A device achieving such functionality can for example be a polarization splitting grating coupler or an edge coupler followed by a polarization sensitive waveguide splitter. Depending on the implementation, the final polarization might end up different in the two waveguides, or the final polarization in the two waveguides might be the same, in which case the polarization is rotated by the polarization splitting apparatus for at least one of the input polarizations. In the former case, the polarization in one of the waveguides can be further rotated with a polarization rotating device in order to obtain identical polarizations in both waveguides and facilitate the design of downstream devices. In both cases, light from a given optical channel is split between the two waveguides according to the polarization of the light incoming from the fiber (the input polarization). The splitting typically occurs substantially according to orthogonal polarizations, but does not need to be exactly orthogonal in a device with finite insertion losses. After the polarization splitting device, the split portions of the light corresponding to a given channel are referred to as the two channel components or the two modulated comb line components.

In a preferred embodiment, the two waveguides receiving the two polarizations are connected to each other and form a loop. Individual optical channels are dropped from the loop with optical ADMs and routed to channel-specific photodiodes. A single resonant device with a resonator supporting two degenerate counter propagating modes can be used to drop both channel components of a given channel (propagating in opposite directions in the loop) from the loop and couple them each to one out of two output ports of the ADM (degenerate modes of a resonator have the same resonant frequency), wherein the first and second channel components are respectively coupled to the first and second output ports of the ADM, respectively via the first and second degenerate modes. These two channel components are then routed via two waveguides from the two output ports of the resonant ADM to the same channel specific photodiode or to several channel specific photodiodes. The ADM used here has two output ports, wherein the resonator is coupled to a drop waveguide and the output ports are located on the drop waveguide on either side of the resonator to drop waveguide junction. The ADM can be implemented with a single resonator. Such a resonator can for example be implemented as a waveguide ring, a disk resonator or be based on other whispering gallery type resonators.

Since channels are dropped from different locations along the loop, the optical path lengths between the polarization splitting device and the channel specific photodiode(s) is different for the two channel components, unless it is compensated for. This compensation can be implemented by adjusting the relative lengths of the two waveguides connecting the two optical ADM output ports to the photodiode(s) according to the path length difference for the two channel components along the waveguide loop. The optical path length between the polarization splitting device and the two input ports of a channel specific photodiode (or between the polarization splitting device and the input ports of two channel and channel component specific photodiodes) should be substantially equal for both channel components, wherein substantially equal refers to the fact that the difference of the group delays incurred by the two channel components should be less than 0.1 unit intervals (UI), wherein a UI is the duration of one symbol (the group delay is the time delay incurred by a pulse propagating through a waveguide). This can be translated in a path length difference $\Delta L$ of less than $0.1 \cdot UI \cdot c_0/n_g$, wherein $c_0$ is the speed of light in vacuum and $n_g$ is the group index of the waveguides. If the geometry of the waveguides constituting an optical path is varying over said optical path, $n_g$ is the weighted average of the group index weighted by the length of the individual waveguide segments.

While architectures are being described here with photodiodes with two input ports, one may equally implement them by using two or more distinct photodiodes followed by signal recombination in the electrical domain, either by electrically connecting the channel specific photodiodes in parallel prior to the signal conversion and amplification with a transimpedance amplifier, or by combining/adding the electrical signals at a later stage (for example after first pre-amplification stages).

As an alternative, two resonant ADMs, one for each of the two waveguides receiving the two input polarizations, can drop the components of an optical channel and route them to a channel specific photodiode. In such a configuration, optical paths should also be balanced in length in order for the two channel components to reach the photodiode with the same group delay. In this configuration the two waveguides receiving the two input polarizations do not need to form a loop, however twice the number of resonant ADMs is required in the architecture, leading to a significant increase in power consumption if the ADMs need to be actively tuned.

In a specially advantageous embodiment of the invention, the optical path between each of the output ports of the polarization splitting element and the add-drop multiplexers comprises at least one phase splitting element. Light components with different phases can then be distributed to different add-drop multiplexers. This phase-sensitive detection may be used, for example, to decode phase shift keyed (PSK) signals.

The receiver architectures described above are compatible with On-Off Keying (OOK), but can also be adapted to be made compatible with other modulation formats such as Differential Phase Shift Keying (DPSK) or Differential Quadrature Phase Shift Keying (DQPSK). In order to demodulate a DPSK or DQPSK signal, demodulators in the form of interferometers having a group delay corresponding to the time duration of one bit (the unit interval) applied to one of their arms may be connected to each of the two waveguides receiving the two polarizations.

Furthermore, the excess waveguide length creating the group delay in one of the interferometer arms may be chosen such that the FSR of the comb source is a multiple of the FSR of the demodulator. In this way, all the channels can be demodulated with the same demodulator. This condition is possible when the FSR of the comb source is a multiple of the data rate. For example, if the data rate is 25 Gbps, a delay of 1 UI will result in an interferometer FSR of 25 GHz, which is compatible with a comb source FSR of 100 GHz (100 GHz is a multiple of 25 GHz since 4×25 GHz=100 GHz). The corresponding outputs of the two demodulators (e.g., 2 outputs for DPSK, 4 outputs for DQPSK) are then either connected to each other with a single waveguide loop per demodulator output type and channels dropped from the loops as previously described with a single ADM per channel and loop (wherein the single ADM drops both channel components from the loop), or the outputs of the two interferometers are connected to individual waveguides each connected to an ADM per channel, per interferometer output type and per interferometer (here too doubling the number of required ADMs). The architecture can be generalized to more complex encoding such as DQPSK, in which case each of the two demodulators will have a higher number of output ports each connected to an individual loop. For example, in the case of DQPSK the demodulators will each have 4 output ports generated by connecting the two waveguides inside the interferometer to a ninety degree hybrid (replacing the directional couplers forming the interferometer outputs for DPSK encoding). As in the case of the previously described OOK receiver, the waveguide lengths connecting the ADMs to the two inputs of one or several photodiode(s) are chosen so as to equalize the group delays (or equivalently the optical path lengths) seen by the two channel components before reaching the photodiode(s).

The ADMs in the receiver already filter out amplified spontaneous emission (ASE) noise generated by the SOA(s). In order to filter out ASE as much as possible, it is beneficial for the pass band of the ADMs to be as small as possible while still supporting the data rate. However, ADMs may also have several pass bands periodically spaced by a FSR, as is the case for example for ring resonator based ADMs. If the gain spectrum of the SOA overlaps with several of the ADM pass bands (e.g., several resonances of a ring resonator), ASE corresponding to adjacent pass bands will also be transmitted to the photodiode, resulting in excess ASE noise in the absence of further filtering (in the form of ASE-ASE beat noise). In order to filter out this unnecessary excess ASE, an additional filter can be implemented, for example after a single SOA or after an interleaver recombining two SOAs, with a filter pass band width on the order of or smaller than the FSR of the ADMs.

If the gain spectrum of the SOA is relatively narrow and is only marginally wider than the frequency span covered by the optical carriers, such additional filtering might not be necessary. Since the gain spectrum of a SOA depends on temperature and can vary from chip to chip, such a narrow gain spectrum could be problematic in the general case. If the comb source is implemented in the form of a semiconductor MLL, an elegant way to circumvent this problem is to implement the SOA and the MLL on the same III-V chip, guarantying good gain medium homogeneity and a shared temperature between MLL and SOA, and thus a spectral alignment of the gain spectra.

The inventors have developed a method to operate an optical link as described herein. The transmitter (TX) and/or the receiver (RX) used in this method comprises at least one parallel configuration of multiple resonant add-drop multiplexers (ADM). The method comprises the following steps:
  evaluating the minimum required power consumption to align each resonant add-drop multiplexer of the parallel configuration to a generated line (EL) with sufficient optical power to sustain an optical link;
  selecting a resonant add-drop multiplexer (ADM) that has a lesser such power consumption than at least one other resonant add-drop multiplexer (ADM) in the parallel configuration;
  tuning the selected resonant add-drop multiplexer (ADM) to said generated line (EL); and leaving at least one non-selected resonant add-drop multiplexer (ADM) misaligned with regard to any generated line (EL), and/or detuning at least one non-selected resonant add-drop multiplexer (ADM) from a generated line.

The inventors have found that not all such multiplexers can be tuned equally well to a generated line, for example, due to fabrication tolerances. Rather than trying to eliminate such tolerances at all costs, it can be more economical to equip the transmitter and/or the receiver with redundant add-drop multiplexers (ADM), and to use only those that can be tuned to carrier frequency (line) of an optical channel with a lower power consumption. The unused multiplexers are cheaper than perfecting a non-redundant number of multiplexers, particularly when integrated in a PLC. An advantage of the method is that the multiplexers can be reconfigured at system start-up or at run-time. This means that the selection does not have to be factory-set, but can, for example, also take into account differences in the performances of the multiplexers that are brought about by variations in ambient temperature.

The inventors have found that in a set-up comprising a multitude of frequency selective elements, like add-drop multiplexers (ADM), and/or frequency selective modulators, some of these components will require less tuning to actively align them to a line that is used to carry a data channel or that is suitable to carry a data channel compared to other such frequency selective elements due to fabrication variability, thermal fluctuations in the environment and/or other disturbances. Less tuning also results in lower power consumption. This saves electrical power, at the cost of sacrificing possible channels for data transmission unless redundancy is built into the system.

Typically, resonator based devices such as resonant ADMs and frequency selective modulators relying on resonators need to be actively tuned to compensate for fabrication variability and/or sensitivity to thermal fluctuations in the environment. This tuning results in additional and undesirable electrical power consumption. The difference between the resonant frequencies of several resonant devices can typically be much better controlled than the absolute resonance frequency of a given device. This can be used to facilitate device tuning, particularly if the relative resonance frequency difference can be guaranteed with a tolerance better than one FSR of the comb source. Instead of implementing the exact number of devices required to support the number of optical channels, a larger number of devices can be implemented. During the link initialization phase, the devices with resonance frequencies closest to the carrier frequencies and whose tuning can be maintained with the smallest electrical power consumption over expected temperature fluctuations are selected by a control system and used to support the optical links. The other devices are not being actively utilized or are powered off to reduce power consumption. This may require also reconfiguration of the electrical connectivity, since a fixed number of electrical data streams needs to be routed to the activated frequency selective modulators, or routed from the activated frequency selective receiver blocks (channel specific ADM(s) plus photodiode(s)). In a transmitter, this scheme will typically result in a situation where a subset of frequency selective modulators has modulation frequencies that are not spectrally aligned with any comb line (the powered down frequency selective modulators, which may still require minimal tuning to ensure they do not interfere with optical channels, as opposed to requiring more tuning to spectrally align them with a channel). In a receiver, this scheme will typically result in a situation where a subset of resonant ADMs is not dropping any incoming optical carrier (the powered down ADMs, which may still require minimal tuning to ensure they do not interfere with optical channels, as opposed to requiring more tuning to spectrally align them with a channel).

In a specially advantageous embodiment of the invention, in the evaluation step of the method, the minimum required power consumptions are computed for a temperature different from the ambient temperature. Preferably, they are computed over a temperature range in which the transmitter (TX) and/or the receiver (RX) is to be operated. In a further advantageous embodiment of the invention, for each add-drop multiplexer (ADM), the maximum value of its minimum required power consumption over said temperature range may be used as a basis for the selecting step.

In this way, it can be taken into account if the operating temperature of the system will foreseeably be different from the start-up temperature. In many applications, a reconfiguration is undesirable during normal operation of the link, since this necessitates a short interruption of the link. It then may make sense to optimize the power consumption not for the start-up temperature at which the link will only be operating for a very short time, but rather for the temperature at which it will be operating for a much longer time. For instance, if it is foreseeable that the transmitter and/or the receiver will warm up from a start-up temperature of 30° C. to 50° C. due to internal power dissipation, then 50° C. can be used as a basis to determine the power consumption. If a link is specified to be operated with a case temperature between 0° C. and 70° C., the worst-case power consumption over this temperature range can be used to safely avoid excessive power consumption and overheating. As another example, if a link is specified to be operated with an ambient temperature between 0° C. and 50° C., the worst-case power consumption over this temperature range can be used to safely avoid excessive power consumption and overheating. Case temperature and ambient temperature are common ways to characterize the temperature of operation in multi-source agreements (MSAs).

Predicting of the tuning power changes over temperature is quite straight forward. Either the tuners are actual thermal tuners, in which case the additional temperature change has simply to be compensated, or the temperature change is converted into a refractive index change of the materials, from which further required tuning is calculated.

Advantageously, the devices are reconfigured not by an electrical switching matrix, but in the optical domain. This avoids parasitic capacitances caused by this switching matrix, which impact the performance of high-speed electronics. In addition, less frequency selective modulators need to be used to provide reconfigurability to other channels. In the transmitter, in a subset of frequency selective modulators, single ADMs may be replaced by 2 ADMs nominally targeted towards different optical carrier frequencies, wherein one of each pair of redundant ADMs can be selected during the start-up phase by a control system to be actively aligned to an optical carrier in reach of its tuning range, whereas the other ADM is then not actively used after selection in the sense that it is detuned relative to actively modulated comb lines. The two redundant ADMs can be described as being in parallel, in that they both extract channels from a common input waveguide and couple them to a common drop waveguide. In a receiver, a subset of ADMs can also be replaced by two parallel ADMs nominally targeted towards different optical carrier frequencies, creating redundancy allowing for reconfigurability, wherein one of the two ADMs is selected during the start-up phase and aligned to an optical carrier, whereas the other ADM is then not actively used after the start-up phase in that the resonance of its constituting resonator is not aligned with a comb line arriving at the receiver (i.e., none of the modulated comb lines arriving at the receiver are dropped by this other ADM).

Optimum reconfigurability can be obtained as follows in one advantageous embodiment: We assume N channels are selectively distributed over M selectively activated frequency selective modulators or receiver ADMs, where M>N and M=N+R (R is the number of redundant devices). Assuming the nominal target frequencies of the M modulators or ADMs to remain ordered as $f_1 < f_2 < \ldots < f_{M-1} < f_M$ even in the presence of fabrication variations, there are R+1 configurations that make the most sense depending on the global mismatch between the target frequencies $f_i$ and the carrier frequencies $f_{c1} \ldots f_{cN}$. These configurations consist in activating devices with nominal target frequencies $f_1$ to $f_N$, or with nominal target frequencies $f_2$ to $f_{N+1}$, or with nominal target frequencies $f_3$ to $f_{N+2}$ etc. . . . up to the range $f_{R+1}$ to $f_{N+R}$. Since the N-R devices with nominal target frequencies $f_{R+1}$ to $f_N$ are always activated, there is no point in providing reconfigurability for these devices, i.e., they can be permanently wired to a given incoming electrical data stream or coupled to a photodetector permanently wired to an outgoing electrical signal line without reconfigurability in the electrical domain, or in case of optical reconfigurability, there is no point in providing redundancy by duplicating ADMs. The devices with nominal target frequencies $f_1 \ldots f_R$ and with nominal target frequencies $f_{N+1}$ to $f_{N+R}$ on the other hand need to be provided with a reconfiguration mechanism, since either a device with a nominal target frequency $f_1$ or a device with a nominal target frequency $f_{N+1}$ is used, since either a device with a nominal target frequency $f_2$ or a device with a nominal target frequency $f_{N+2}$ is used etc. In other words, in the case of electrical reconfigurability, each of the devices with nominal target frequencies $f_i = f_1$ to $f_R$ need to be duplicated with devices with nominal target frequencies $f_j = f_{N+1}$ to $f_{N+R}$, respectively, wherein an electrical switch allows routing a data stream to one out of the two devices if they are frequency selective modulators, or allows routing a data stream from one out of two photodetectors connected to the devices if they are ADMs in a receiver. In that sense, an electrical switch will typically provide more reconfigurability than is required. In the case of optical reconfigurability, ADMs with nominal target frequencies $f_i = f_1$ to $f_R$ need to be duplicated with parallel ADMs with nominal target frequencies $f_j = f_{N+1}$ to $f_{N+R}$, respectively. While this dynamic reconfigurability scrambles the allocation between electrical data streams and optical carriers in the transmitter, the identical reconfiguration can be implemented in the receiver, so that the final allocation between electrical transmitter input ports and electrical receiver output ports remains unchanged. These matched reconfigurations can occur automatically by means of using the same decision algorithm in both transmitter and receiver, provided fabrication and temperature variabilities of nominal target frequencies are sufficiently small, or matched reconfigurations can be forced during a link training sequence by exchanging information between transceivers (transmitter receiver pairs) connected on either side of the same optical fiber(s).

The relative merits of the reconfigurability disclosed here and the reconfigurability taught in (Y. Zheng, P. Lisherness, M. Gao, J. Bovington, S. Yang, K.-T. Cheng, "Power-Efficient Calibration and Reconfiguration for On-Chip Optical Communication," Proc. of the Design, Automation & Test in Europe Conference, 1501 to 1506, (2012)) compare as follows: A drawback of the method taught in Y. Zheng et al. is that the FSR of the frequency selective modulators needs to be close to the difference between the frequencies of the highest and lowest frequency channels. In the method disclosed here, however, the FSR of the frequency selective modulators can be significantly larger than the difference between the frequencies of the highest and lowest frequency channels without compromising the capability of the method to reduce the necessary tuning ranges. Larger FSRs are obtained by smaller devices, which require less power to be tuned and, in the case where the resonant device is also the modulator, also require less power to modulate the light (this is due to the fact that smaller resonators also have a higher finesse). Thus, power consumption can be further reduced.

While photodetectors used in these system architectures are preferably photodiodes, including photodiodes leveraging the avalanche effect, the utilization of the term "photodiode" is not meant to restrict the invention to architectures utilizing photodiodes since the architectures can also be implemented with other types of photodetectors. Furthermore, while several preferred embodiments rely on ring resonators, they can also be implemented with disk resonators. The terminology free spectral range, as well as references to periodic spacing in the frequency domain/periodic spectral spacing, both refer to substantially periodic spacing in the frequency domain, but are not restricted to exact periodic spacing. Indeed, devices such as RRMs, resonant ADMs and CROWs have substantially periodic characteristics in the frequency domain such as periodic resonances or periodic pass bands/stop bands, however this spacing slowly varies due to group index dispersion of the constituting waveguides. The reference to substantially periodic spacing can be understood as implying perfectly periodic spacing if the devices were implemented in hypothetic perfectly dispersion-less waveguides, but with small deviations from perfect periodicity due to waveguide dispersion.

A first element located downstream of a second element refers to the fact that light generated by the comb source first propagates through the second element and then through the first element. A first element located upstream of a first element refers to the fact that light generated by the comb source first propagates through the first element and then through the second element. While "upstream" and "downstream" may appear ambiguous on casual inspection for receiver architectures where the two output ports of a polarization splitting element, or the output ports of demodulators, are connected to each other with a waveguide loop, there is actually a clear directionality since the modulated comb lines are dropped from the loop by add-drop multiplexers. In other words, channel components injected by one output port of the polarization splitting element do not reach the other output port, resulting in unambiguous directionality of the signal flow.

A first element described as being coupled to a second element, connected to a second element or routed to a second element means in all cases that light propagates from an output port of the first element to an input port of the second element or that light propagates from the first element to the second element via a coupling junction. They can be coupled, connected or routed directly, via a waveguide, coupling junction, free space beam or another coupling apparatus without further interposed devices, or indirectly via interposed devices. When comb lines are modulated they acquire a larger spectral distribution, so that one may refer to their center frequency, or to the frequency of the underlying optical carrier. A polarization splitting coupler or a polarization splitting device following a dual-polarization coupler are both polarization splitting elements. Since the optical carriers in this description are all comb lines, the terms "modulated optical carrier" or "modulated comb line" can be used interchangeably. In this description, the distinction between the standalone term "optical carrier" and the standalone term "comb line" is simply that some comb lines, such as for example a comb line on the edge of the spectrum of a semiconductor mode-locked laser, might not have sufficiently good performance specifications (RIN, optical power) to reliably transport data in the described system, while optical carrier implies that the comb line is actually being used for data transport at some point inside the system. A similar consideration holds for "channel" and "modulated comb line". Since the described optical transceiver sub-system is at the lowest physical level and from a signal processing point of view is located after electrical pre-coding and before electrical decoding, a low level channel can be associated one to one with a modulated comb line and "channel" can be interchanged with "modulated comb line". For example "channel component" and "modulated comb line component" are interchangeable. This does not preclude the utilization of this architecture in larger systems were higher level super-channels are being distributed on the low level channels described here.

The present disclosure includes a wavelength division multiplexed (WDM) optical link, wherein the optical link supports multiple channels, light for the optical channels is generated by a comb source, cascaded frequency selective modulators are used to modulate the channels, light generated by the comb source is partially filtered out before reaching a semiconductor optical amplifier (SOA) by one out of an optical filter comprising coupled resonators or frequency selective modulators operated in drop configuration. More than one SOA can be used to amplify the light, wherein optical channels are then preferentially interleaved between two SOAs. A receiver is preferentially implemented with a polarization splitting coupler or a dual-polarization coupler followed by a polarization splitting device, wherein two output ports of the polarization splitting coupler or polarization splitting device are connected to each other with a waveguide loop, optical channels are dropped from the waveguide loop with resonant add-drop multiplexers (ADM), and the ADMs are connected to photodiodes by means of two optical paths balancing out group delays. The frequency selective modulators of the transmitter subsystem, the resonant ADMs of the receiver subsystem and the photodiodes of the receiver subsystem can be preferentially fabricated in Silicon-on-Insulator (SOI) technology, wherein the device layer of SOI chips supports optical waveguiding devices and Germanium grown on the silicon device layer provides a suitable absorbing material for photodiodes. SOAs and certain types of optical comb sources such as semiconductor mode-locked lasers (MLLs) are preferentially fabricated in III-V material hybridly or heterogeneously integrated with the SOI transceiver subsystem. The system architectures described herein were selected in particular for their suitability for integration in Silicon Photonics technology.

The invention additionally comprises an optical link according to the following points. These are not to be construed to limit the scope of the invention according to the present disclosure.

1. An optical link, wherein a transmitter of said optical link comprises
   a comb source generating more than one comb line and having a free spectral range,
   more than one frequency selective modulators sharing an input bus waveguide and modulating comb lines generated by the comb source,
   a first semiconductor optical amplifier
   wherein a subset of the more than one comb lines is filtered out by a filter located downstream of the comb source and upstream of the first semiconductor optical amplifier comprising at least a first resonator coupled to the input bus waveguide and at least a second resonator and wherein one of
   the first and second resonators are coupled to each other, or
   the optical filter consists in more than one frequency selective modulators selectively coupling modulated comb lines to one or several drop bus waveguides.

2. The optical link of point 1, wherein the semiconductor optical amplifier is operated with an input power below its 3 dB gain compression point and wherein the semiconductor optical amplifier is located downstream of the frequency selective modulators.

3. The optical link of point 1, wherein the transmitter further comprises a second semiconductor optical amplifier and an interleaver with a free spectral range, wherein said interleaver couples modulated comb lines to one of a first or a second interleaver output port according to their center frequency, wherein the first and second output ports of the interleaver are respectively routed to the first and the second semiconductor optical amplifier, wherein the center frequencies of the modulated comb lines coupled to the first output port of the interleaver are spaced from each other by an even multiple of the interleaver free spectral range and wherein the center frequencies of the modulated comb lines coupled to the second output port of the interleaver are spaced by an odd multiple of the interleaver free spectral range relative to the frequencies of the modulated comb lines coupled to the first output port of the interleaver.

4. The optical link of point 1, wherein the transmitter further comprises a second semiconductor optical amplifier, wherein the more than one frequency selective modulators are operated in drop configuration, wherein the more than one frequency selective modulators are grouped into a first and a second subset, wherein the first subset of frequency selective modulators shares a first drop bus waveguide and the second subset of frequency selective modulators shares a second drop bus waveguide, and wherein the first drop bus waveguide is connected to the first semiconductor optical amplifier and the second drop bus waveguide is connected to the second semiconductor optical amplifier.

5. The optical link of point 4, wherein the transmitter further comprises an interleaver with a free spectral range, wherein the first subset of frequency selective modulators modulates comb lines with center frequencies spaced from each other by an even multiple of the interleaver free spectral range and wherein the second subset of frequency selective modulators modulates comb lines with center frequencies spaced by an odd multiple of the interleaver free spectral range relative to the frequencies of the comb lines modulated by frequency selective modulators of the first subset of frequency selective modulators.

6. The optical link of point 1, wherein the optical link further comprises a receiver connected to the transmitter of point 1 by means of an optical fiber, wherein said receiver comprises a polarization splitting element splitting light from each modulated comb line into a first and a second modulated comb line component according to the polarization of the comb line inside the fiber, wherein the first and second modulated comb line components are respectively routed to a first and a second output port of the polarization splitting element, wherein first and second modulated comb line components split from a same modulated comb line are both coupled by means of one or several resonant add-drop multiplexers to one out of
  a same photodiode,
  several photodiodes electrically connected in parallel to an input of a single transimpedance amplifier, or
  several photodiodes electrically connected to more than one amplifier or pre-amplifier stage, wherein electrical signals generated by said more than one amplifier or pre-amplifier stage are being combined at a later stage.

7. The optical link of point 6, wherein the first and the second output ports of the polarization splitting element are connected to each other with a waveguide loop, or wherein the first and second output ports of the polarization splitting element are respectively connected to a first and a second demodulator, wherein at least one output port of the first demodulator is connected to an output port of the second demodulator by means of a waveguide loop.

8. The optical link of point 7, wherein the first and second modulated comb line components split from the same modulated comb line are both routed from the waveguide loop to the one or several photodiodes via a single resonant add-drop multiplexer having a first and a second output port, wherein said resonant add-drop multiplexer comprises a resonator with a first and a second degenerate mode coupled to a drop waveguide, wherein the output ports of said add-drop multiplexer consist in two locations on said drop waveguide on either side of the junction between the resonator and the drop waveguide, wherein said first modulated comb line component is coupled to the first mode of the resonator and the first mode of the resonator is coupled to the first output port of said add-drop multiplexer, and wherein said second modulator comb line component is coupled to the second mode of the resonator and the second mode of the resonator is coupled to the second output port of said add-drop multiplexer.

9. The optical link of point 8, wherein the first and the second output ports of the add-drop multiplexer are respectively connected to the one or several photodiodes via a first and a second waveguide, wherein the lengths of said first and second waveguide are different and are chosen such that the difference between the group delays between the polarization splitting element and said one or several photodiodes for both comb line components is smaller than 0.1 unit intervals.

10. The optical link of point 1, wherein a frequency selective modulator comprises a modulator coupled to the input bus waveguide by means of at least two parallel resonant add-drop multiplexers, wherein one of the two parallel resonant add-drop multiplexers has a resonance spectrally aligned with a comb line generated by the comb source and wherein one of the two parallel resonant add-drop multiplexers does not have any resonance spectrally aligned with a comb line generated by the comb source.

11. The optical link of point 10, wherein the at least two parallel resonant add-drop multiplexers comprise an apparatus to tune their resonant frequencies, and wherein a control system selects during a training sequence which of the at least two parallel resonant add-drop multiplexers is tuned to have one of its resonances spectrally aligned with a comb line generated by the comb source.

12. The optical link of point 6, wherein a photodiode is coupled to the upstream system by means of at least two parallel resonant add-drop multiplexers, wherein one of the two parallel resonant add-drop multiplexers has a resonance spectrally aligned with a modulated comb line generated by the transmitter and the other of the two parallel resonant add-drop multiplexers does not have any resonance spectrally aligned with a modulated comb line generated by comb source of the transmitter.

13. The optical link of point 12, wherein the at least two parallel resonant add-drop multiplexers comprise an apparatus to tune their resonant frequencies, and wherein a control system selects during a training sequence which of the at least two parallel resonant add-drop multiplexers is tuned to have its resonances spectrally aligned with a modulated comb line generated by the comb source of the transmitter.

14. The optical link of point 1, wherein at least one frequency selective modulator is not spectrally aligned to any of the comb lines generated by the comb source and wherein an electrical switch is configured so as not to route an electrical data stream to said not spectrally aligned frequency selective modulator.

15. The optical link of point 1, wherein a frequency selective modulator is a resonant ring modulator.

16. The optical link of point 1, wherein a frequency selective modulator comprises a Mach-Zehnder modulator coupled to the bus waveguide by means of at least one resonant add-drop multiplexer.

17. The optical link of point 1, wherein comb lines are filtered out by means of an optical filter located downstream of the comb source and upstream of the semiconductor optical amplifier, wherein said optical filter comprises coupled resonators bi-directionally coupled to each other, wherein the optical filter has a free spectral range, and wherein the free spectral range of the optical filter is larger than the difference between the center frequency of the highest frequency modulated comb line and the center frequency of the lowest frequency modulated comb line.

18. The optical link of point 1, wherein the comb source is a semiconductor comb laser, wherein the semiconductor comb laser and the semiconductor optical amplifier are monolithically fabricated on a single chip out of III-V compound semiconductors, and wherein the frequency selective modulators are fabricated in a Silicon-on-Insulator chip.

DESCRIPTION OF THE DRAWINGS

Further advantageous embodiments will now be illustrated using drawings without limiting the scope of the invention. The Figures show:

FIGS. 1a-1f: Examples of frequency selective modulators operated in through and drop configurations.

FIG. 1 illustrates examples of frequency selective modulators operated in through and drop configurations.

FIG. 1a is a block diagram of a frequency selective modulator FSM operated in through configuration. The frequency selective modulator FSM has an input port I and a through port T. A component of the input signal that matches the line to which the frequency selective modulator FSM is tuned is modulated according to a data stream $c_i$-$c_4$, which is not shown for clarity. The remainder of the input signal remains untouched. The output at the through port T is a superposition of the modulated and unmodulated signals.

FIG. 1c shows a realization of the configuration shown in FIG. 1a using a resonant ring modulator RRM. This resonant ring modulator RRM is connected to the input port I and to the through port T by means of a bus waveguide B. The arrows illustrate the direction in which signals propagate.

FIG. 1e shows another realization of the configuration shown in FIG. 1a using a Mach-Zehnder modulator MZM. The frequency selectivity sits in the add-drop multiplexer (ADM). Out of the input signal delivered at port I, the add-drop multiplexer ADM picks the one component that matches the line (carrier) to which this add-drop multiplexer ADM is tuned. This component is coupled into the modulation loop ML. After passing the Mach-Zehnder modulator MZM and being modulated according to the data stream, this component reaches the add-drop multiplexer ADM again and is coupled out to through port T. This frequency selective modulator can be implemented with a single resonant add-drop multiplexer ADM comprising a single resonator. The input port I and the through port T are implemented and coupled to the add-drop multiplexer ADM by means of a bus waveguide B.

FIG. 1b shows a frequency selective modulator FSM in drop configuration. Out of the signal delivered at input port I, the component that matches the line to which the frequency selective modulator FSM is tuned is modulated according to a data stream and output to the drop port D. The part of the input signal that is not modulated is passed through to the through port T. A signal delivered at the add port A that does not match the line to which the frequency selective modulator FSM is tuned is added to the output signal at the drop port D.

FIG. 1d shows a realization of the configuration shown in FIG. 1b with a resonant ring modulator RRM. The input port I and through port T are implemented and coupled to the resonant ring modulator RRM by means of an input bus waveguide IB. The drop port D and the add port A are implemented and coupled to the resonant ring modulator RRM by means of a drop bus waveguide DB.

FIG. 1f shows a realization of the configuration shown in FIG. 1b with two add-drop multiplexers ADM and one Mach-Zehnder modulator MZM. Out of the input signal on the input bus waveguide IB, the add-drop multiplexer ADM picks the component that corresponds to the line to which it is tuned. This component is coupled into the Mach-Zehnder modulator MZM and modulated according to the data stream. The outcome of this is coupled onto the drop port waveguide DB by means of a second add-drop multiplexer ADM that is tuned to the same line as the first one.

FIG. 2a shows a cascade of two frequency selective modulators FSM1 and FSM2 in through configuration. Out of the signal at the input port I1, the FSM1 picks the component that corresponds to the line to which it is tuned. This component is modulated according to a first data stream. The rest of the input signal remains unmodulated. Both the modulated and the unmodulated signal are output as a superposition on through port T1, which is coupled to the input port I2 of the second frequency selective modulator FSM2.

The second frequency selective modulator FSM2 picks a second signal component that corresponds to the line to which it is tuned. This component is modulated according to a second data stream. The component that was modulated in the first modulator FSM1 is not modulated further. Signal components that match neither of the lines to which FSM1 and FSM2 are tuned are not modulated at all. The superposition of the two modulated components and the unmodulated signal is output at the through port T2.

Figure 1C:
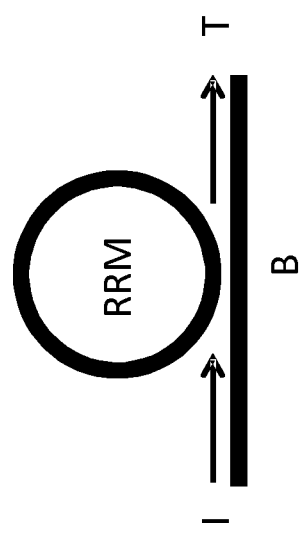
Figure 1D:
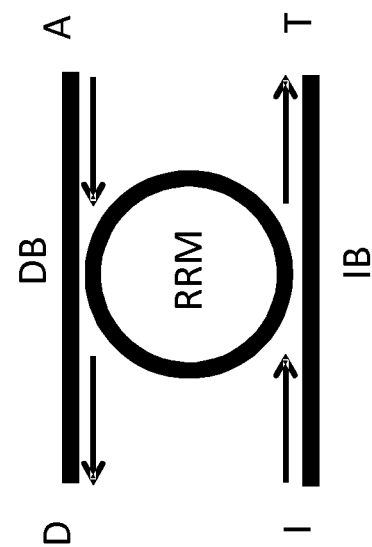
Figure 2A:
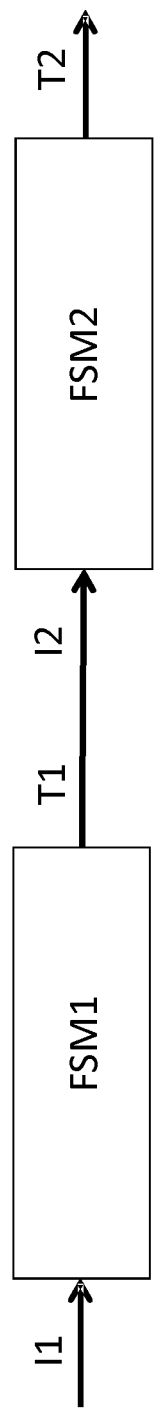
FIGS. 2a-2e: Examples of configurations of cascaded frequency selective modulators.
Figure 2B:
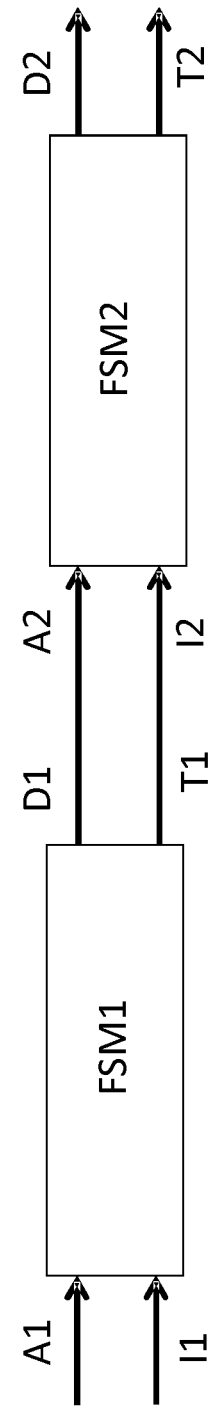

FIG. 2b shows a cascade of two frequency selective modulators FSM1 and FSM2 in drop configuration. This configuration differs from the one shown in FIG. 2a in that FSM1 outputs its modulated signal onto drop port D1 and passes the unmodulated part of the input signal to through port T1. The drop port D1 of FSM1 is coupled to the add port A2 of FSM2. The through port T1 of FSM1 is coupled to the input port I2 of FSM2.

Out of the input signal at port I2 that FSM1 has left unmodulated, FSM2 picks the component that corresponds to the line to which it is tuned. After this component has been modulated with the second data stream, it is output on drop port D2 together with the signal that had previously been modulated by FSM1; since this signal does not match the line to which FSM2 is tuned, it is just added to the component modulated by FSM2 at the drop port D2.

The net effect of this cascade is that D2 now carries only signal components that have been modulated either by FSM1 or FSM2, while the through port T2 only carries components that have not been modulated at all. According to an embodiment of the invention, only D2 is coupled to the optical amplifier SOA, so that its available power is used solely to amplify carriers that have been actually modulated with a data stream. The signal from through port T2 is discarded into a beam dump.

Figure 2C:
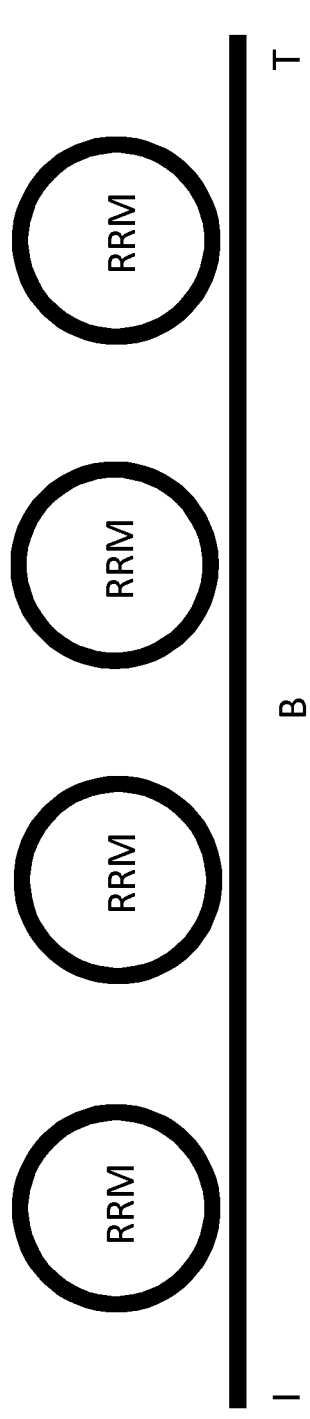

FIG. 2c shows a realization of the configuration shown in FIG. 2a with four resonant ring modulators RRM. They share a common bus waveguide B.

Figure 2D:
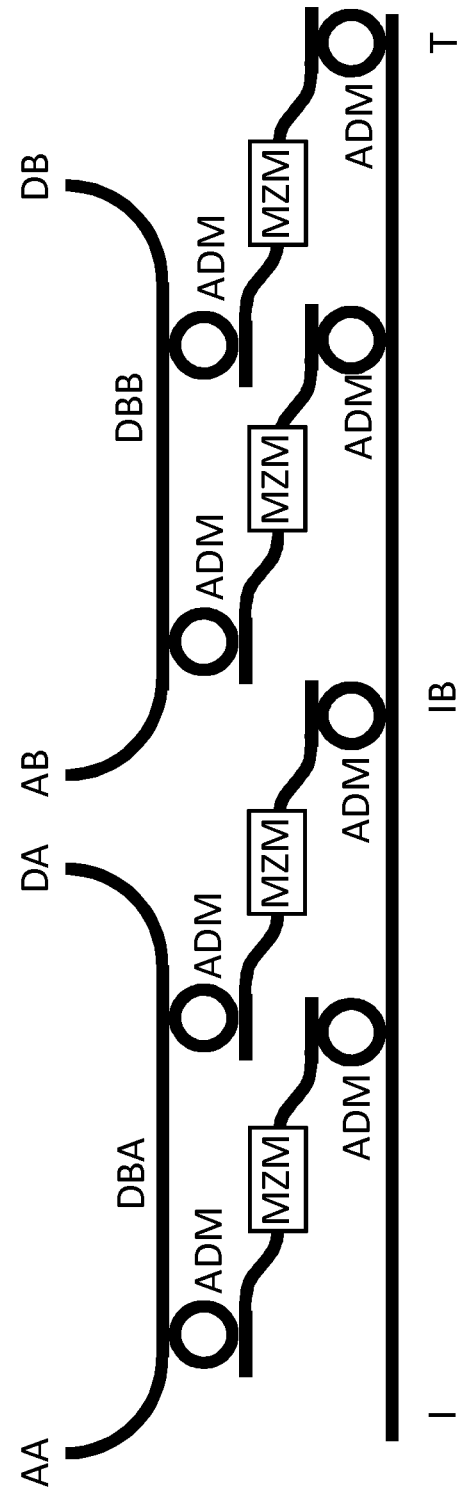

FIG. 2d shows a realization of the configuration shown in FIG. 2b with four Mach-Zehnder modulators MZM that are each coupled to an input bus waveguide IB by means of an individual add-drop multiplexer ADM. Each of the modulators picks a signal component corresponding to the line to which it is tuned, and outputs it onto one of the two drop buses DBA and DBB. Drop bus DBA begins with a first add port AA and ends in a first drop port DA. Drop bus DBB begins with a second add port AB and ends in a second drop port DB. Unmodulated signal components pass along the entire input bus waveguide to through port T and are discarded. Each one of the drop buses DBA and DBB carry only carriers (lines) that have been modulated according to a data stream. Both drop ports DA and DB can be connected to separate optical amplifiers SOA, so that their power can be combined to amplify the signals modulated by all four Mach-Zehnder modulators MZM.

Figure 2E:
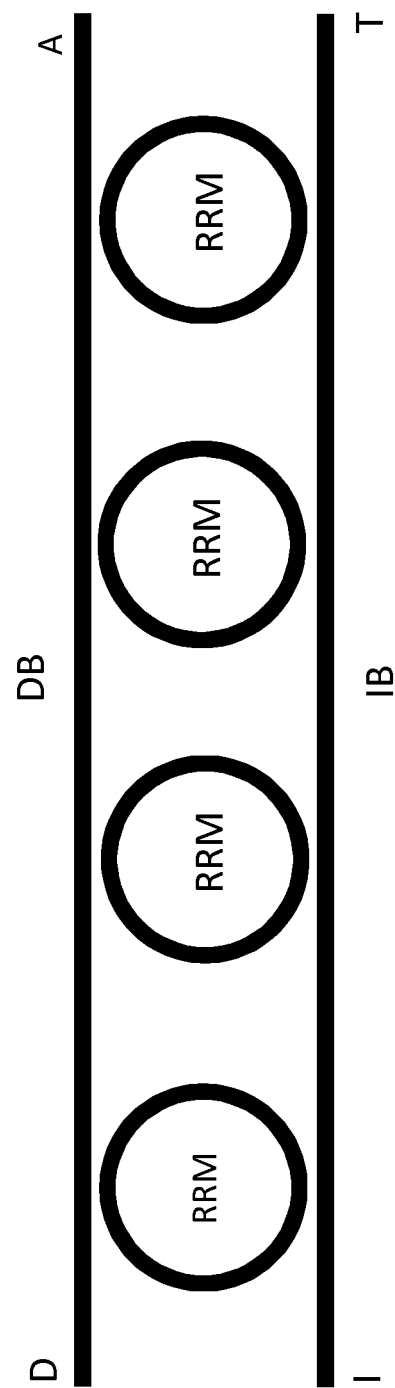

FIG. 2e shows a cascade of resonant ring modulators (RRM) disposed between a common input bus waveguide IB and drop bus waveguide DB in drop configuration. The main difference compared with a cascade of frequency selective modulators according to FIG. 2d is that the add and drop ports have been reversed. Consequently, the direction of propagation along the drop bus waveguide DB has been reversed as well.

In each frequency selective modulator, a first resonant ADM couples target frequencies from the input bus waveguide to a second waveguide connected to the input of the MZM. A second resonant ADM couples target frequencies coinciding with the target frequencies of the first resonant ADM from a third waveguide connected to the output port of the MZM to a drop bus waveguide of the frequency selective modulator. It should be noted that each of the ADMs also have an input waveguide and a drop waveguide, wherein the input waveguide of the first ADM is the input bus waveguide of the frequency selective modulator, the drop waveguide of the first ADM is the second waveguide connected to the input port of the MZM, the input waveguide of the second ADM is the third waveguide connected to the output port of the MZM, and the drop waveguide of the second ADM is the drop bus waveguide of the frequency selective modulator. Two subsets of frequency selective modulators are shown, wherein a first subset shares a first drop bus waveguide and a second subset shares a second drop bus waveguide.

Figure 3A:
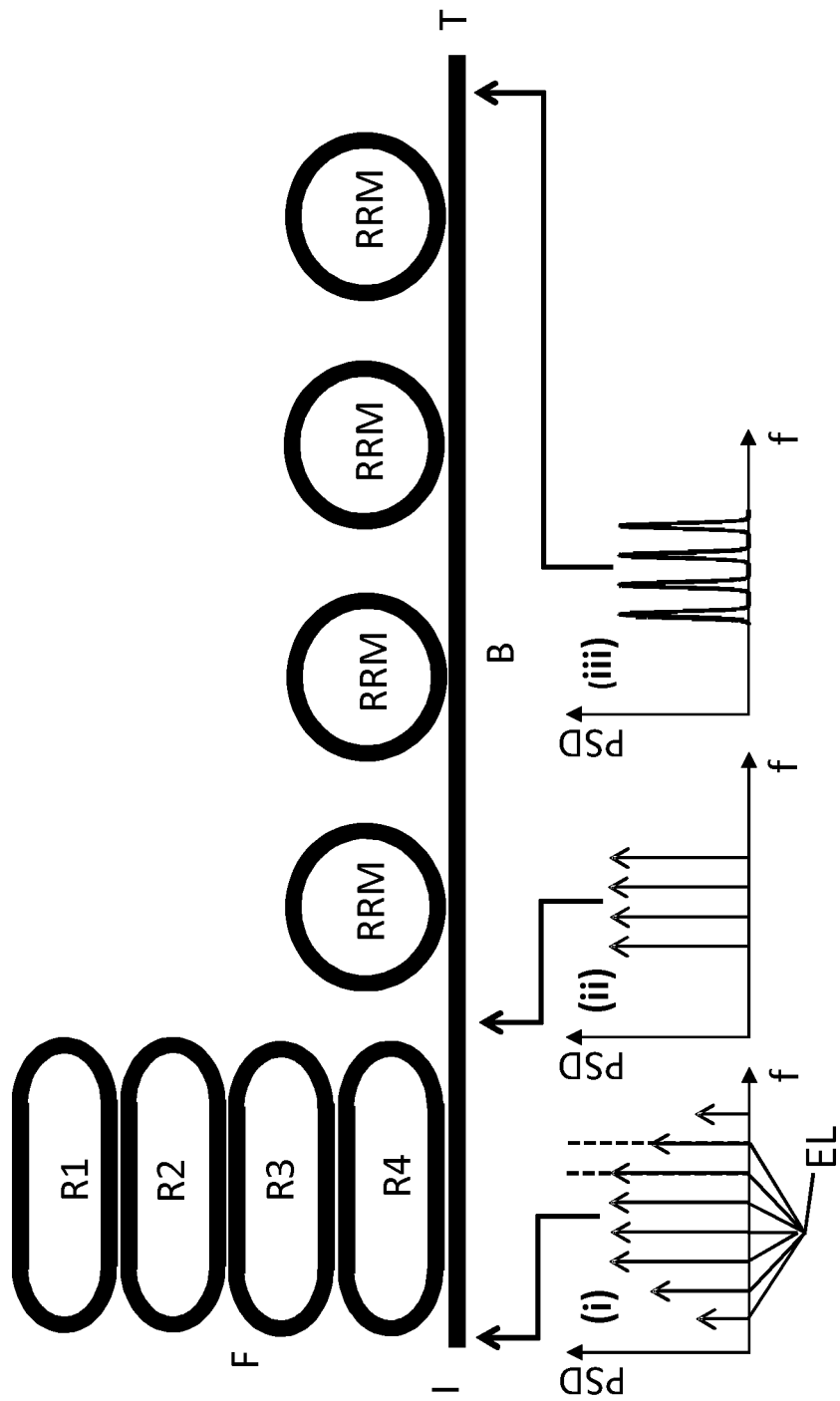
FIGS. 3a-3b: Filtering of undesired comb lines with a CROW filter.
Figure 3B:
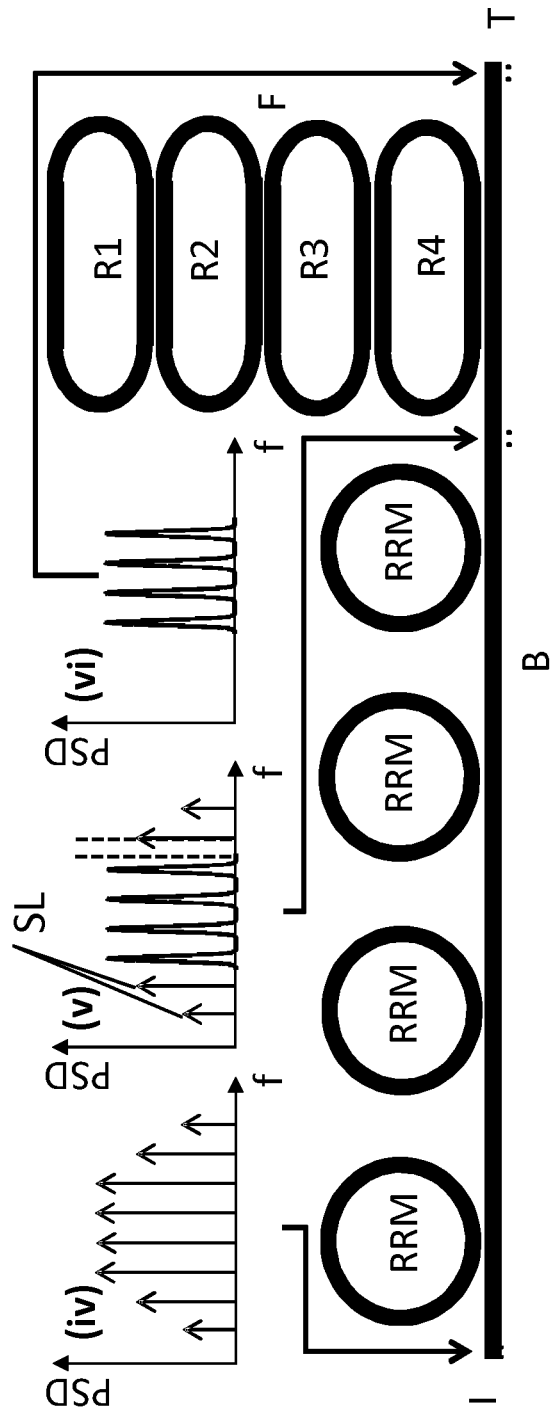

FIG. 3 shows how the configuration shown in FIG. 2c can be upgraded to get rid of unmodulated signal components on the through port T. FIG. 3a shows a configuration where the optical CROW filter F comprising coupled resonators R1, R2, R3 and R4 is placed before the frequency selective modulators RRM modulating comb lines with frequencies f closest to the edges of the stop bands of the optical filter. FIG. 3b shows a configuration where the optical filter is placed after said frequency selective modulators. The optical filter is exemplarily shown as a CROW based optical filter F and four modulated channels are being exemplarily shown to fall in between adjacent stop bands of the CROW filter (equivalently, to fall in a pass-band of the CROW filter F). Insets (i) to (vi) show optical spectra along the bus waveguide B, where PSD stands for power spectral density. EL denotes emitted lines from the comb source in general, while SL denotes unwanted, unmodulated sidelines that are filtered. There are two relevant CROW filter F stop bands here: One immediately below the frequency of the lowest frequency carrier (further referred to as the lower stop band) and one immediately above the frequency of the highest frequency carrier (further referred to as the upper stop band). In (i), the two vertical dashed lines show the frequency range in which the lower edge of the upper stop band has to fall for configuration (a). This allows filtering out the two highest frequency comb lines shown in the diagrams that are undesired since their power is too low, without impacting the highest frequency optical carrier. A similar tolerance holds for the upper edge of the lower stop band. The two vertical dashed lines in (v) show the frequency range in which the lower edge of the upper stop band has to fall for configuration (b). This frequency range is smaller than in (i), because the adjacent optical carrier has already been modulated, and thus its spectrum has been broadened in the frequency domain. A similarly reduced tolerance also holds for the upper edge of the lower stop band. Vertical arrows in the optical spectra represent Dirac peaks and symbolize unmodulated optical carriers. Modulated optical carriers are represented with widened distributions.

Figure 4:
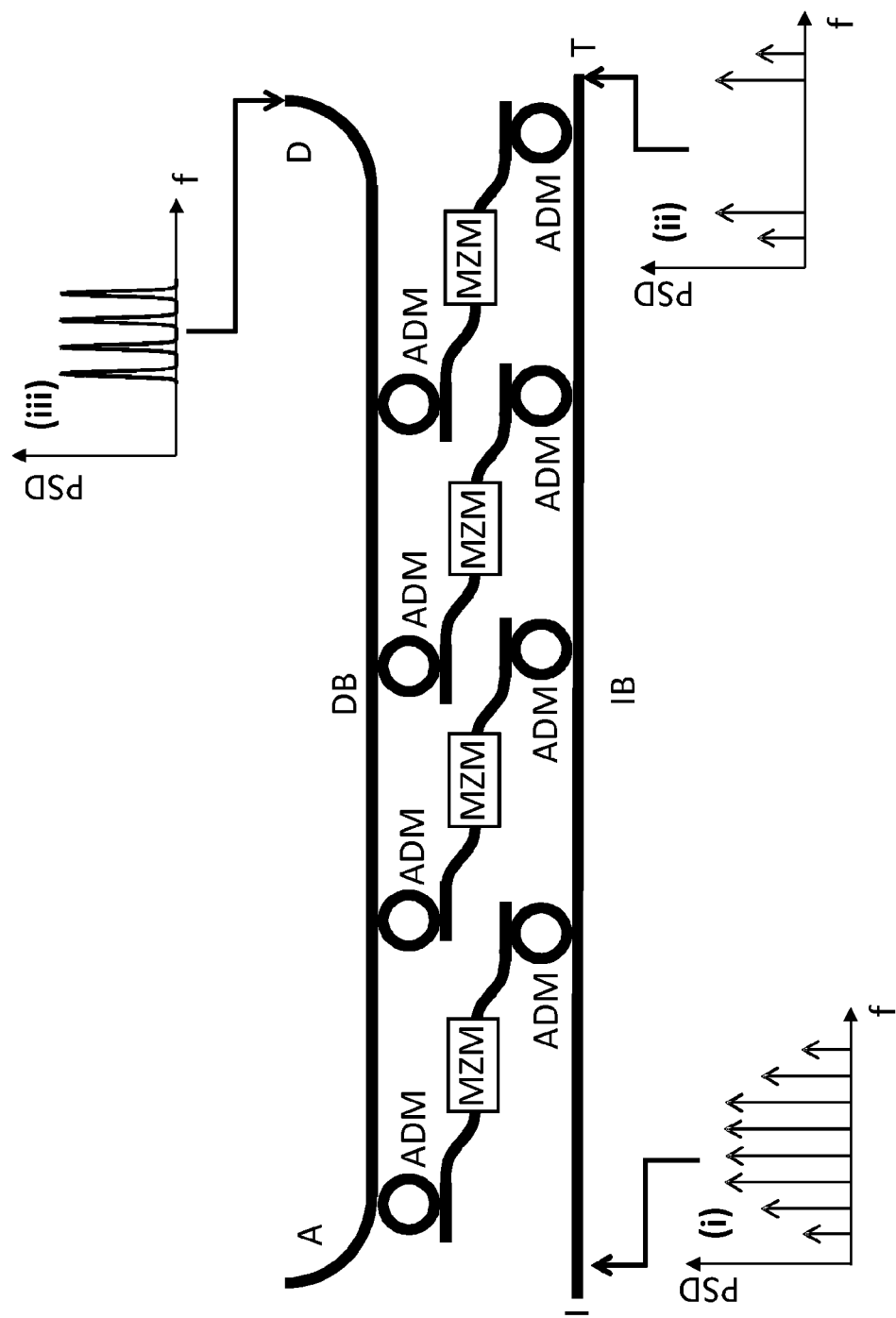
FIG. 4: Filtering of undesired comb lines with cascaded frequency selective modulators in drop configuration.

FIG. 4 shows an embodiment where undesired comb lines are filtered in a configuration in which cascaded frequency selective modulators are operated in drop configuration. Each frequency selective modulator consists of a Mach-Zehnder modulator MZM that is connected to the input bus waveguide IB and to the drop bus waveguide DB by one add-drop multiplexer ADM each. The insets show the optical spectra at different locations in the structure. Since only modulated optical carriers are routed to the drop bus, filtering occurs naturally in this structure without the need to add an additional optical filter. This can be seen in that the lower power unmodulated comb lines remain in the input bus waveguide and are routed to the through port, which can for example be further connected to a waveguide termination/beam dumb device suppressing back-reflections or to a monitor photodiode for system monitoring or for a control system. Vertical arrows in the optical spectra represent Dirac peaks and symbolize unmodulated optical carriers. Modulated optical carriers are represented with widened distributions.

Figure 5:
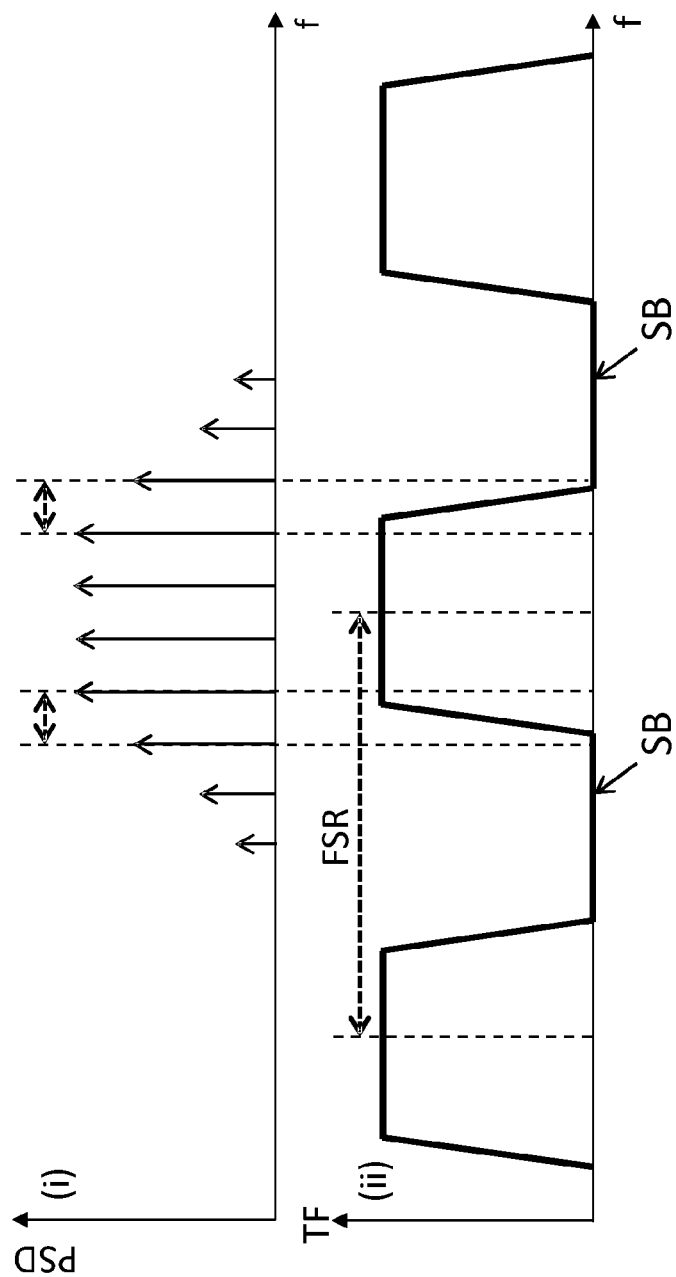
FIG. 5: Filtering using an optical filter with periodic stop bands.

FIG. 5 shows an overlay between the spectrum of the comb source and the transmission function TF of an optical filter F with periodically spaced stop bands SB separated by a free spectral range FSR. The comb source is exemplarily shown as having four high power comb lines used as optical carriers. Six additional undesirable comb lines, three on either side of the optical carriers, are also represented. The high transmission regions of the optical filter transfer function correspond to pass bands, while the low transmission regions of the optical filter transfer function correspond to stop bands. The horizontal arrows in (i) represent the frequency regions in which the edges of the stop bands have to fall. The horizontal arrow in (ii) represents the FSR of the optical filter. This FSR has to be larger than the difference between the frequencies of the highest frequency and the lowest frequency optical carriers.

Figure 6:
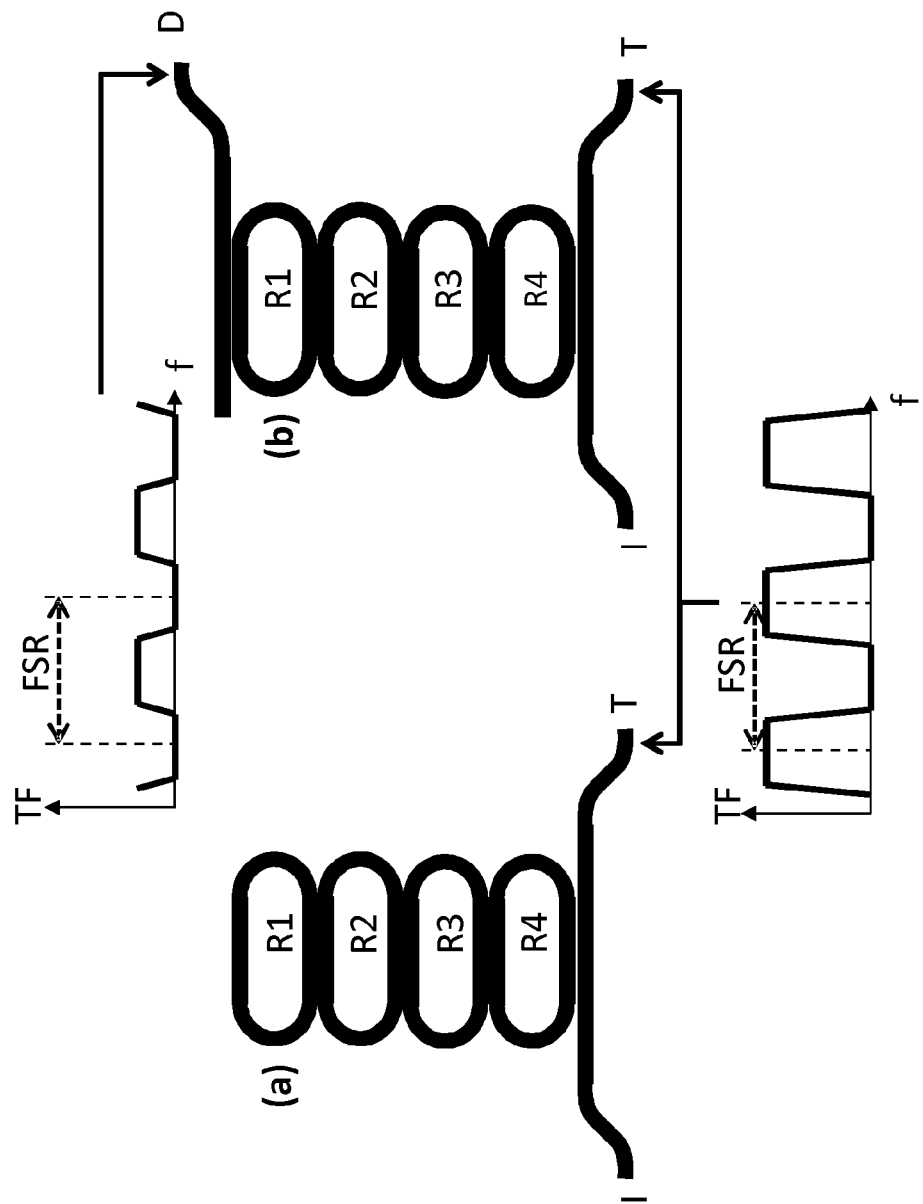
FIG. 6: Diagrams of CROW filters in through and drop configuration.

FIG. 6 shows diagrams of CROW filters in (a) through and (b) drop configuration. The insets respectively show the transfer functions from the input port to the through port and from the input port to the drop port. Note that "CROW filter in through configuration" refers to the fact that the data channel path passes through the through port, i.e., the through port is directly or indirectly routed to a SOA (e.g., with interposed frequency selective modulators). A CROW filter in through configuration may or may not have a drop port, wherein an optional drop port can be used for other purposes, such as for example connection to a monitor photodiode for monitoring the system, providing a feedback signal for a control system, or connecting to a waveguide termination/beam-dump that suppresses back-reflections. As shown in (b), the signal arriving at the drop port is typically attenuated even inside the pass-bands of the drop port, making the through configuration more desirable.

Figure 7:
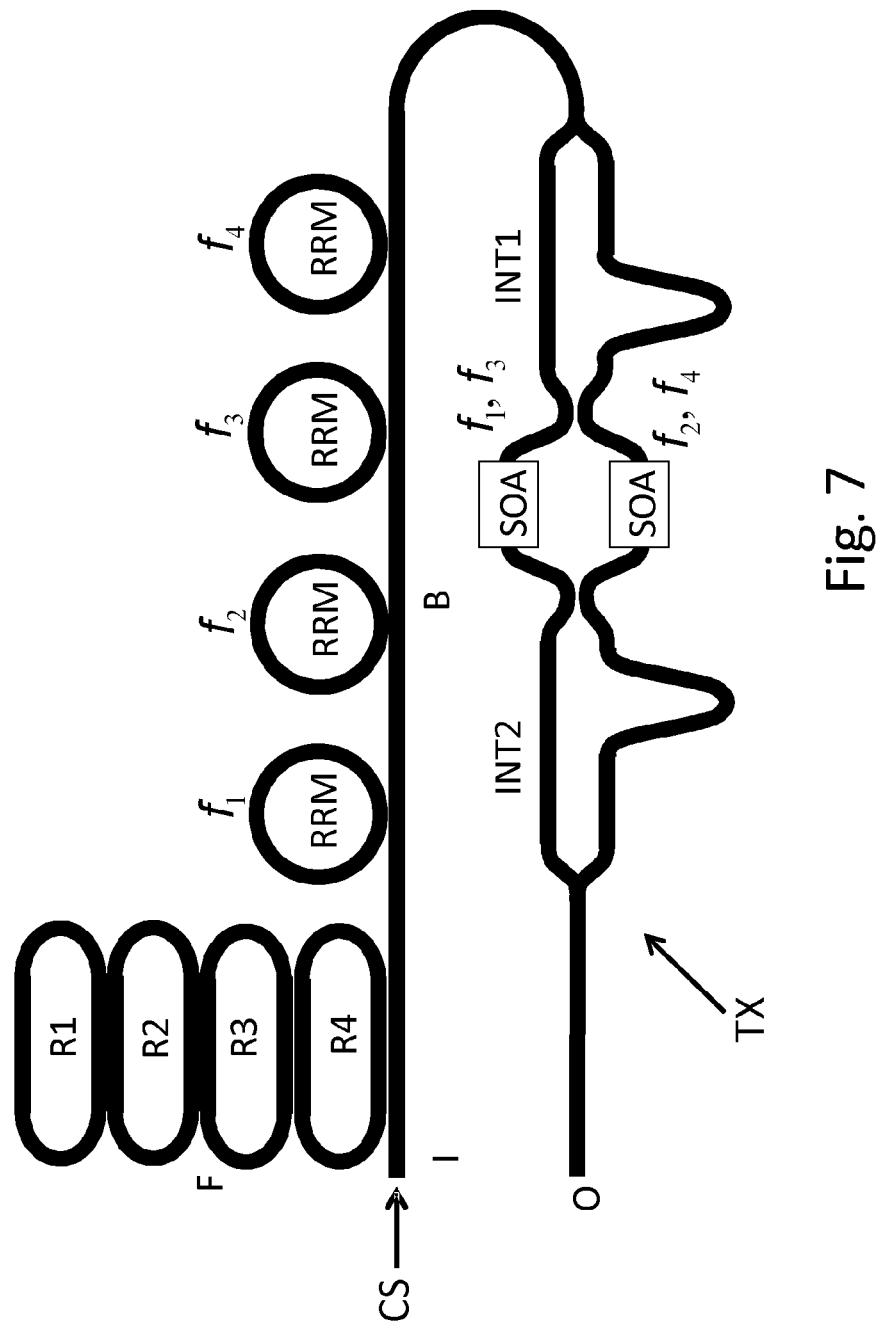
FIG. 7: Transmitter with optical filter and two interleavers.

FIG. 7 shows an embodiment of a complete transmitter TX. The light source CS is a comb source. Undesired lines are filtered out by a filter F, which is implemented as a CROW filter with coupled resonators R1, R2, R3, R4. The remaining lines at frequencies $f_1$, $f_2$, $f_3$ and $f_4$ are each modulated according to different data streams with resonant ring modulators RRM. A first interleaver INT1 forwards odd lines $f_1$, $f_3$ to a first semiconductor optical amplifier SOA and even lines $f_2$, $f_4$ to a second semiconductor optical amplifier SOA, so that each of these amplifiers has to take only half the power of the modulated signal. The outputs of both amplifiers SOA are then recombined into one output O that is fed into an optical fiber.

Figure 8:
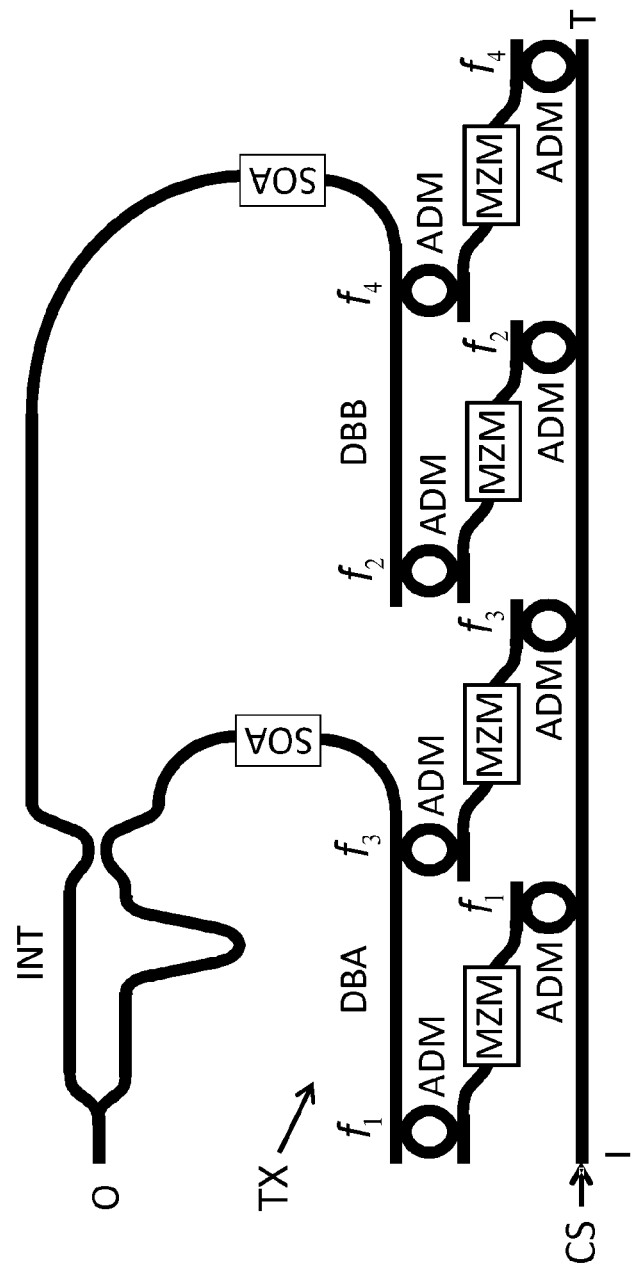
FIG. 8: Transmitter with two drop buses and one interleaver.

FIG. 8 shows another embodiment of a transmitter TX wherein frequency selective modulators FSM are cascaded in drop configuration, and wherein two groups of frequency selective modulators FSM each share their own drop bus DBA, DBB. The two drop busses DBA, DBB are each connected to an individual SOA. The outputs of the SOAs are recombined with an interleaver INT. The first group of frequency selective modulators FSM sharing a first drop bus DBA modulate odd optical carriers with center frequencies $f_1$ and $f_3$, while the second group of frequency selective modulators FSM sharing a second drop bus modulate even optical carriers with center frequencies $f_2$ and $f_4$. This partitioning into even and odd carriers allows subsequent recombination of the carriers transported by the two drop bus waveguides DBA, DBB into a single output waveguide O by means of an interleaver INT.

Figure 9:
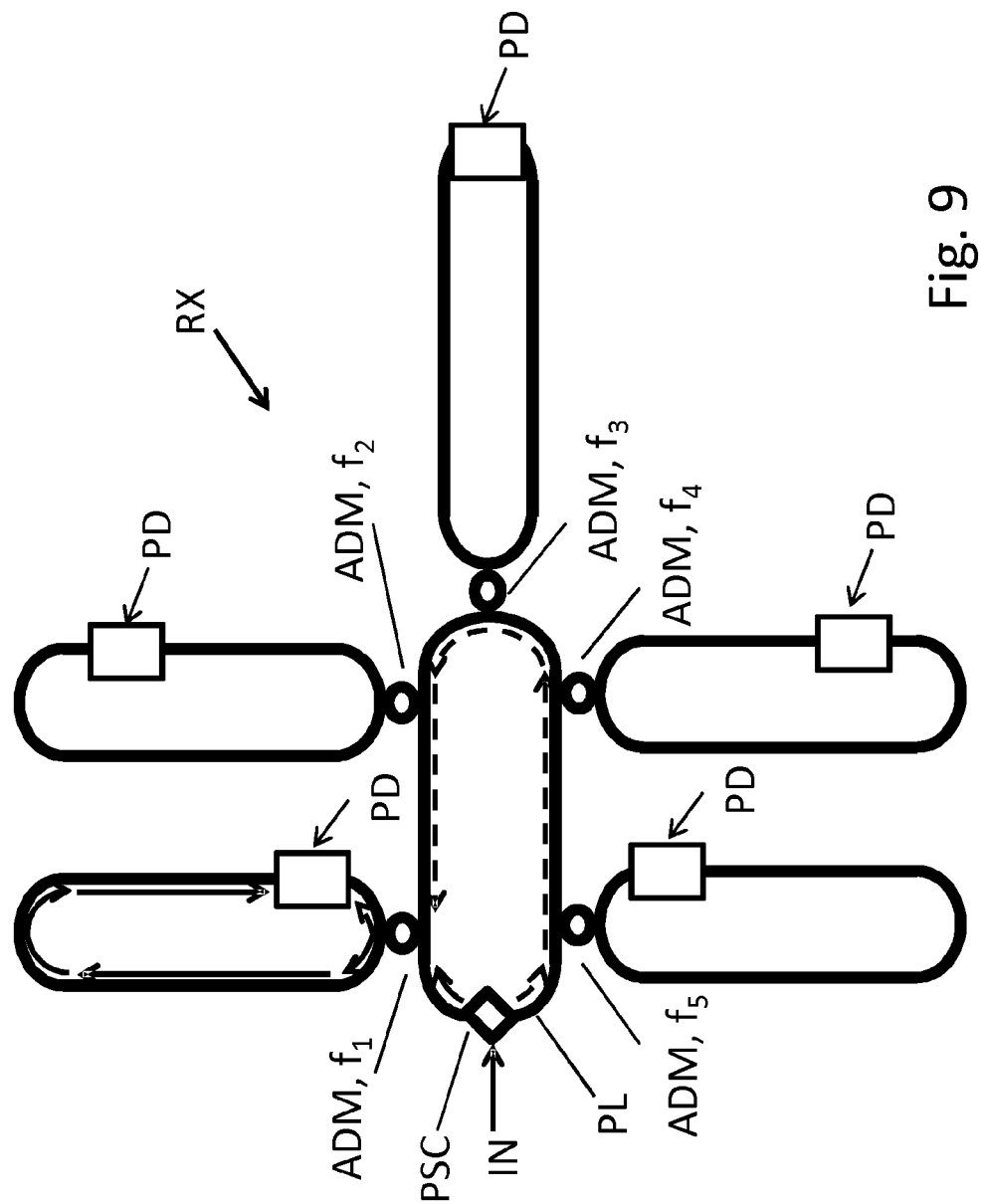
FIG. 9: Receiver with closed loop between the two output ports of the polarization splitting element.

FIG. 9 shows an embodiment of a receiver RX in which light from each channel is split into two channel components by a polarization splitting grating coupler PSC according to the polarization of the light inside the fiber that delivers the input optical signal IN to the polarization splitting grating coupler PSC. The two channel components are each routed to individual output ports of the polarization splitting grating coupler PSC. The two output ports are connected to a waveguide forming a loop PL connected to frequency selective add-drop multiplexers (ADMs) tuned to different carrier frequencies $f_1$-$f_5$. The ADMs each couple both components of a same channel to an individual photodiode PD, wherein the photodiode PD may have two input ports, each receiving one channel component. The lengths of the two waveguides between the ADM and the photodiode (PD) are generally different from each other and vary from channel to channel, so that for each channel $f_1$-$f_5$ the optical path lengths between the polarization splitting grating coupler and the photodiode input ports are substantially equal for both channel components. The optical paths followed by the two channel components of the channel with optical carrier frequency $f_1$ are respectively shown by dashed and continuous arrows and are designed to be substantially of equal length.

Figure 10:
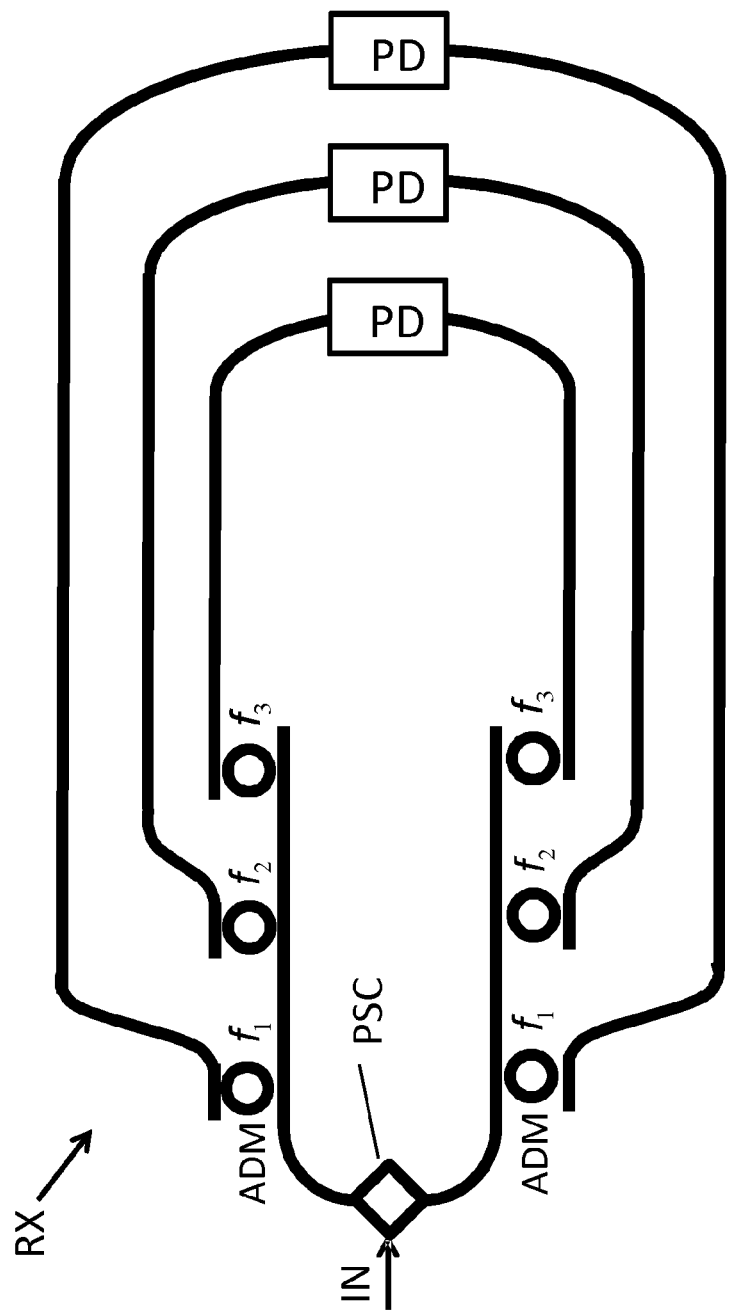
FIG. 10: Receiver with two add-drop multiplexers per carrier frequency.

FIG. 10 shows a receiver RX in which light from each channel IN is split into two channel components by a polarization splitting grating coupler PSC according to the polarization of the light inside the fiber connected to the polarization splitting grating coupler PSC. The two channel components are each routed to individual output ports of the polarization splitting grating coupler. The two output ports are connected to two waveguides each connected to frequency selective add-drop multiplexers (ADMs). The ADMs each couple a component of a channel to an individual channel-specific photodiode, wherein the photodiode may have two input ports, each receiving one channel component. The lengths of the two waveguides between the channel specific ADMs and the photodiode (PD) are chosen such that the optical path lengths between the polarization splitting grating coupler and the photodiode input ports are substantially equal for both channel components.

Figure 11:
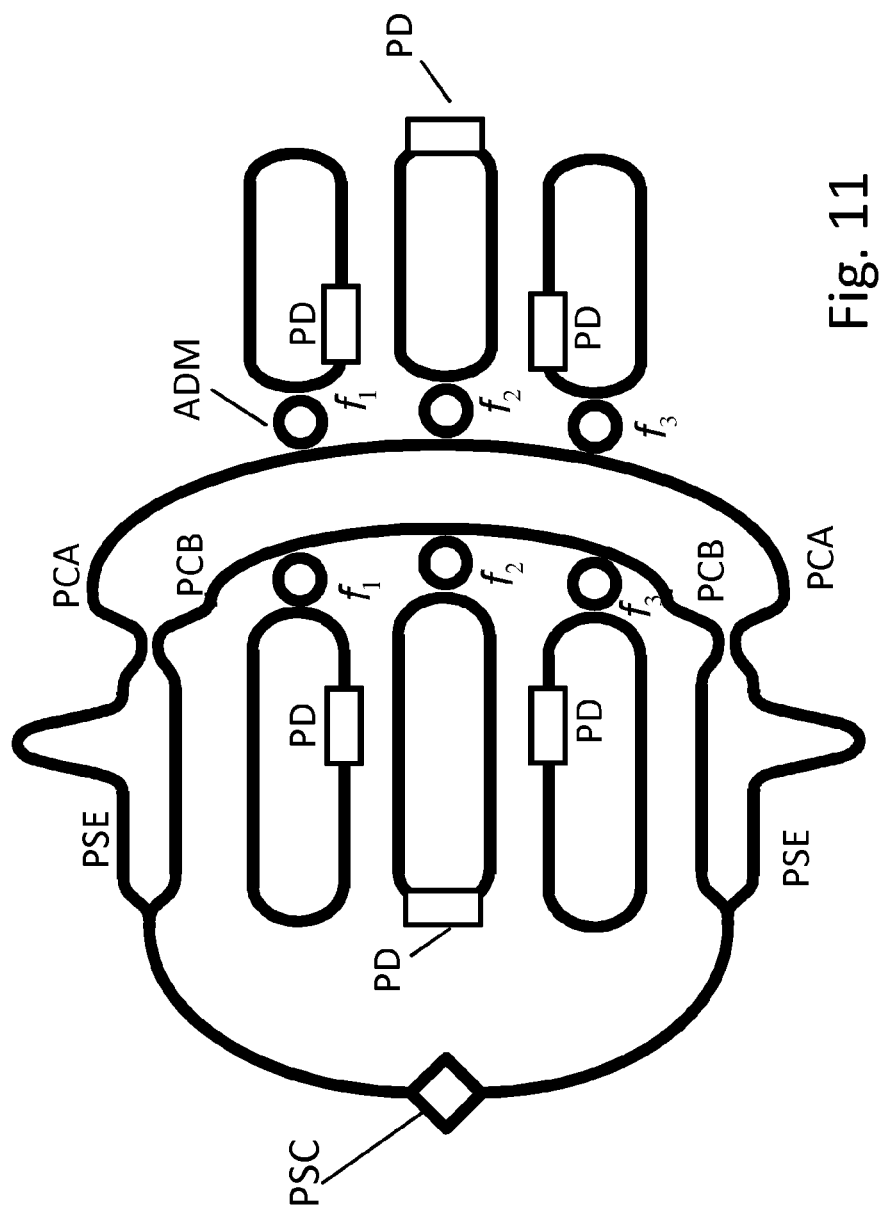
FIG. 11: Receiver for DPSK encoded signals.

FIG. 11 shows a receiver RX for DPSK encoded signals. The two outputs of a polarization splitting grating coupler PSC are each connected to a DPSK demodulator as phase splitting element PSE, each DPSK demodulator PSE having two output ports. Corresponding output ports, labeled by PCA or PCB in the diagram, are respectively connected to each other with a first and a second waveguide loop. Resonant add-drop multiplexers ADM couple both channel components of a given channel and demodulator output port type to an individual photodiode PD, wherein a first pair of waveguides each routing one channel component from the corresponding ADM coupled to the first waveguide loop to the first channel specific photodiode PD are sized in such a manner as to substantially equalize the optical path lengths between the polarization splitting coupler PSC and the first channel specific photodiode PD for the two channel components. Furthermore, a second pair of waveguides each routing one channel component of the same channel from the corresponding ADM connected to the second waveguide loop to a second channel specific photodiode PD are sized in such a manner as to substantially equalize the optical path lengths between the polarization splitting coupler PSC and the second channel specific photodiode PD to each other as well as to the optical path lengths between the polarization splitting coupler PSC and the first channel specific photodiode PD. The DPSK demodulators PSE are constituted by Mach-Zehnder interferometers with an additional waveguide length applied to one of the interferometer arms. The output stage of the interferometer consists in a directional coupler.

Figure 12:
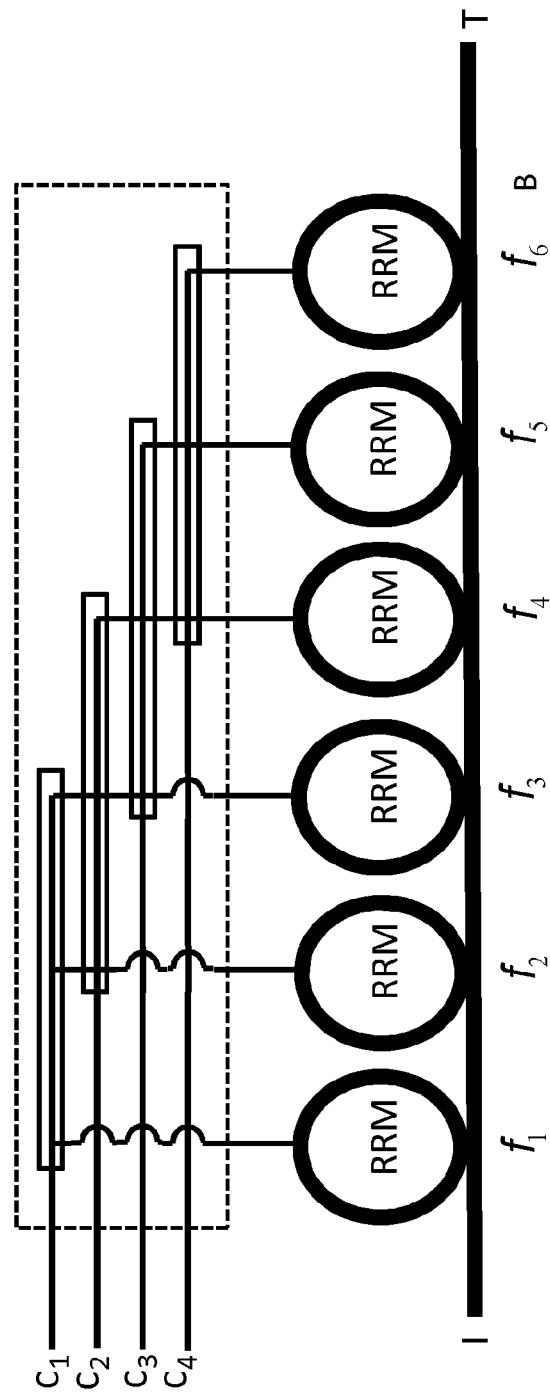
FIG. 12: Electrical reconfiguration of frequency selective modulators in a transmitter.

FIG. 12 shows six frequency selective modulators with nominal target frequencies $f_1$ to $f_6$ used to transport data according to four electrical data streams $c_1$ to $c_4$. During the start-up phase, a subset of frequency selective modulators RRM (here 4 out of 6) is selected based on the ease of aligning them to the actual optical carrier frequencies with an active control system. An electrical connectivity matrix is reconfigured to electrically connect the four electrical data streams $c_1$ to $c_4$ to the four frequency selective modulators that have been selected and activated. The boxes inside the connectivity matrix represent electrical switches allowing the selective connectivity of the data stream to one out of three possible frequency selective modulators.

Figure 13:
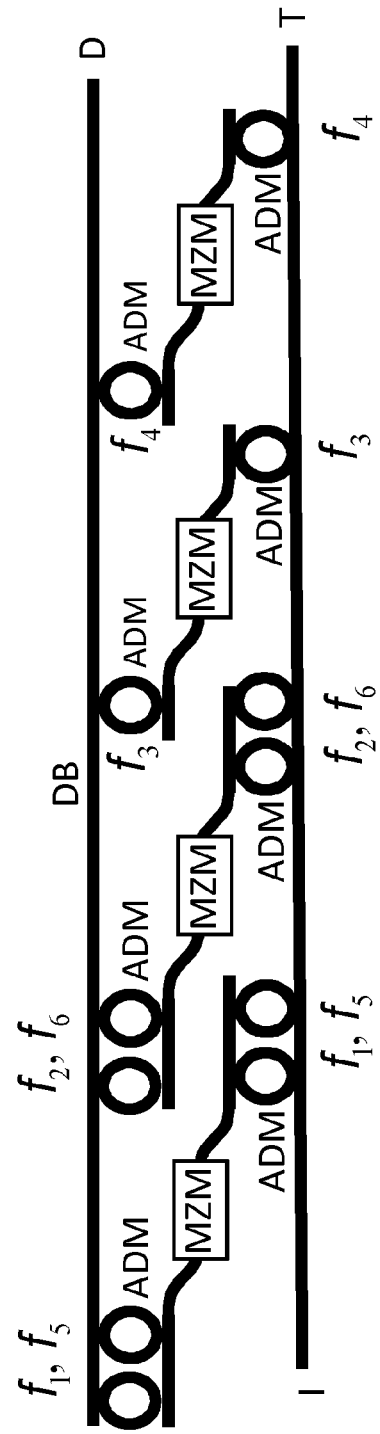
FIG. 13: Optical reconfiguration of frequency selective modulators in a transmitter.

FIG. 13 shows an embodiment of a transmitter TX with reconfigurability in the optical domain. ADMs in a subset of frequency selective modulators are each replaced by two ADMs targeted towards nominally different optical carrier frequencies EL. Here, the two leftmost frequency selective modulators are exemplarily implemented with such redundant ADMs, wherein both the ADM coupling the input bus to a MZM and the ADM coupling the MZM to the drop bus are replaced by two redundant ADMs. In the first frequency selective modulator (counting from the left), the ADMs are replaced by two ADMs nominally targeted towards $f_1$ and $f_5$, and in the second frequency selective modulator the ADMs are replaced by two ADMs nominally targeted towards $f_2$ and $f_6$. The nominally targeted frequencies are ordered as $f_1<f_2<f_3<f_4<f_5<f_6$ and are spaced by one comb source FSR. The transmitter can be exemplarily configured in one out of three states, utilizing ADMs with nominal target frequencies $f_1<f_2<f_3<f_4$, $f_2<f_3<f_4<f_5$ or $f_3<f_4<f_5<f_6$ depending on which subset is easier to tune to the actual optical carrier frequencies (including for which subset it is easier to maintain the spectral alignment to the optical carrier frequencies over expected temperature variations). In each of these configurations, each frequency selective modulator is only effectively modulating one optical carrier with a frequency corresponding to a target drop frequency of one of the ADMs from within a pair of redundant parallel ADMs. The other ADM of the ADM pair is either detuned relative to any other comb line, tuned to a comb line that is filtered out by an upstream or downstream optical filter or tuned to a comb line that is not coupled to a photodiode inside the receiver. The redundant ADMs for each of the two leftmost frequency selective modulators each have targeted optical carrier frequencies separated by 4 comb source FSRs, while the actively utilized spectrum consists in 4 comb lines covering only 3 comb source FSRs. Thus, an optical filter with a pass band spanning slightly more than 3 comb source FSRs can be implemented, filtering out undesired comb lines. Alternatively, the nominally unused ADMs after start-up selection can be detuned so as not to let a comb line through, in which case the aforementioned filter function is not necessary.

Figure 14:
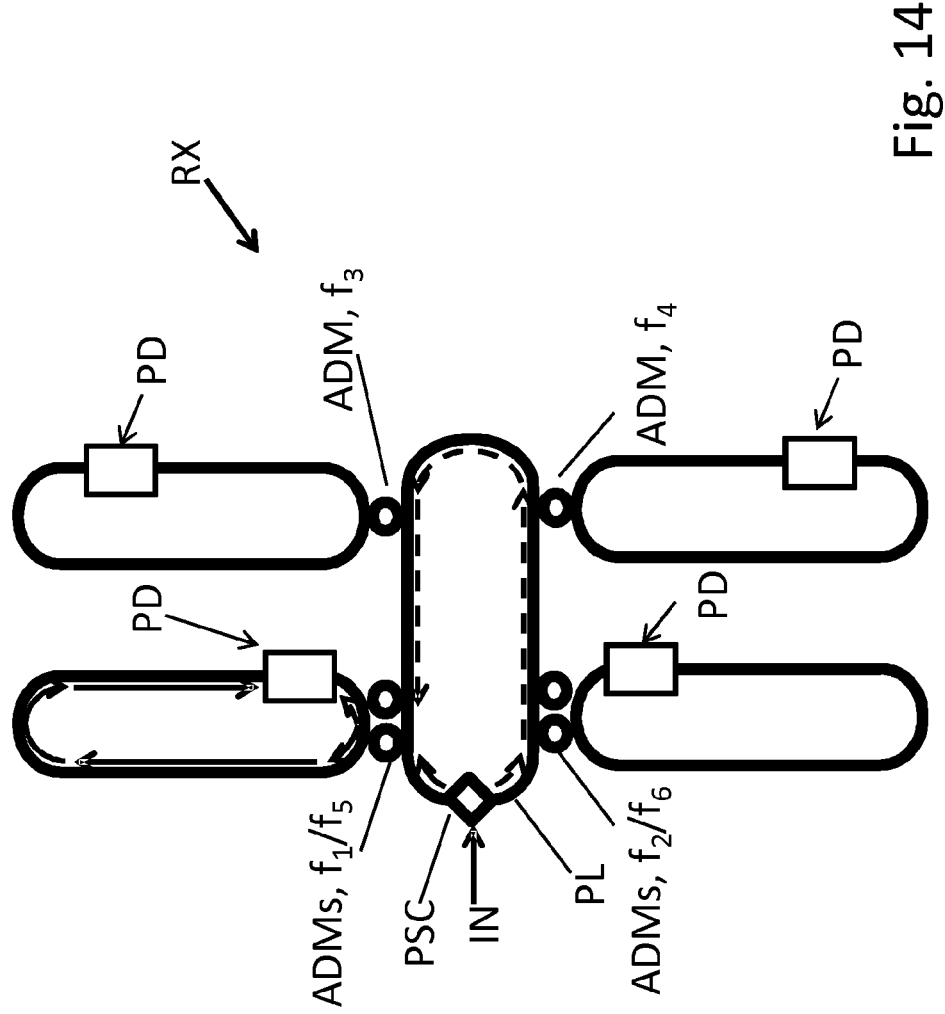
FIG. 14: Optical reconfiguration of a receiver.

FIG. 14 shows an embodiment of a receiver RX with reconfigurability in the optical domain. A subset of ADMs are each replaced by two ADMs targeted towards nominally different optical carrier frequencies. Here, the two leftmost photodiodes PD are exemplarily coupled to the loop waveguide PL with such redundant ADMs. One photodiode is coupled with two ADMs nominally targeted towards $f_1$ and $f_5$, another photodiode is coupled with two ADMs nominally targeted towards $f_2$ and $f_6$. The nominally targeted frequencies are ordered as $f_1<f_2<f_3<f_4<f_5<f_6$ and are spaced by one FSR of the comb source CS. The receiver RX can be exemplarily configured in one out of three states, utilizing ADMs with target carrier frequencies $f_1<f_2<f_3<f_4$, $f_2<f_3<f_4<f_5$ or $f_3<f_4<f_5<f_6$ depending on which subset is easier to tune to the actual optical carrier frequencies (including for which subset said spectral alignment with incoming optical carriers is easier to maintain over expected temperature variations). In every configuration, each photodiode PD is only receiving one optical carrier EL since the frequency difference between the targeted frequencies of the two redundant ADMs exceeds the total spectral width of the utilized portion of the comb source spectrum.

Figure 15:
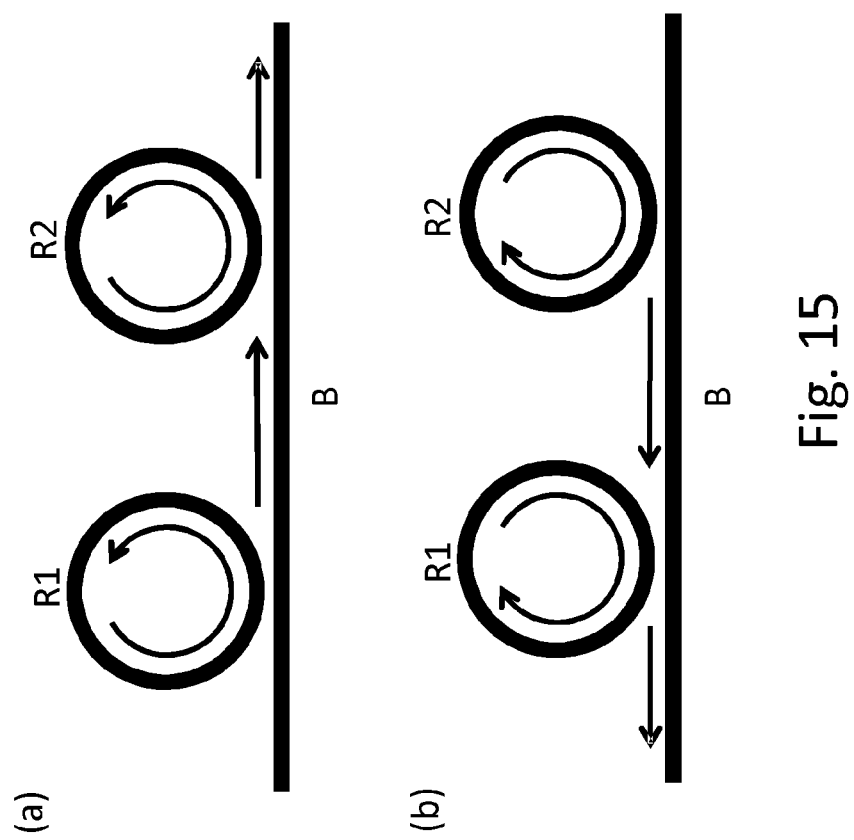
FIG. 15: Example of unidirectional coupling between two resonators.

FIG. 15 shows an example of uni-directional coupling between two ring resonators R1 and R2 (non bi-directional coupling). The counterclockwise propagating mode of a $1^{st}$ ring resonator R1 can couple to the counterclockwise propagating mode of a $2^{nd}$ ring resonator R2, and the clockwise propagating mode of the $2^{nd}$ ring resonator R2 can couple to the clockwise propagating mode of the $1^{st}$ ring resonator R1. However, the clockwise propagating mode of the $1^{st}$ ring resonator cannot couple to the $2^{nd}$ ring resonator, and the counterclockwise propagating mode of the $2^{nd}$ ring resonator cannot couple to the $1^{st}$ ring resonator, thus bi-directional coupling between a mode of the $1^{st}$ resonator and a mode of the $2^{nd}$ resonator is not given.

LIST OF REFERENCE SIGNS

A, A1, A2 add port
AA add port of drop bus waveguide DBA
AB add port of drop bus waveguide DBB
ADM add-drop multiplexer
B bus waveguide
CS light source
D, D1, D2 drop port
DA drop output port of drop bus waveguide DBA
DB drop output port of drop bus waveguide DBB
DB, DBA, DBB drop bus waveguide
EL lines generated by the light source CS
$c_1$-$c_4$ data streams
F optical filter
f, $f_1$-$f_6$ frequencies
FSM, FSM1-2 frequency selective modulator
FSR free spectral range
I, I1, I2 input port
IB input bus waveguide
IN input optical signal for receiver RX
INT, INT1-2 interleavers
ML loop containing Mach-Zehnder modulator MZM
MZM Mach-Zehnder modulator
output port
RRM resonant ring modulator
R1-R4 resonators
RX receiver
PCA output port of phase splitting element PSE for phase component A
PCB output port of phase splitting element PSE for phase component B
PD photodiode
PL loop between output ports of polarization splitting element PSC
PSC polarization splitting element
PSD power spectral density
PSE phase splitting element
SB stop band
SL unmodulated side line
SOA semiconductor optical amplifier
T, T1, T2 through port
TF transmission function of optical filter F
TX transmitter

The invention claimed is:

1. A transmitter for an optical link, comprising a light source generating a plurality of discrete lines with different frequencies routed to a common input bus waveguide, further comprising a plurality of frequency selective modulators, each frequency selective modulator having an input port, a through port, an add port and a drop port and being configured to:
   modulate at least one of the discrete lines provided on the input port according to a data stream,
   output the modulated line on the drop port,
   pass all other light frequencies from the input port to the through port, and
   wherein the transmitter further comprises at least one drop bus waveguide and at least one optical amplifier configured to simultaneously amplify multiple lines,
   wherein the light source is a comb source, each of the at least one optical amplifiers is a semiconductor optical amplifier, and the frequency selective modulators are arranged in a drop configuration to share the common input bus waveguide as their input bus and to share the at least one drop bus waveguide as their drop bus,
   wherein the drop bus is routed to a respective semiconductor optical amplifier, so that only generated lines that are modulated by at least one frequency selective modulator are routed to the respective semiconductor optical amplifier.

2. The transmitter of claim 1, wherein the plurality of frequency selective modulators comprises at least two subsets of frequency selective modulators, wherein each subset of frequency selective modulators share a common drop bus waveguide.

3. The transmitter of claim 2, wherein each of the at least one drop bus waveguide is routed to an individual optical amplifier.

4. The transmitter of claim 3, wherein the outputs of at least two optical amplifiers are recombined.

5. The transmitter of claim 4, wherein the outputs of two optical amplifiers are recombined with an interleaver.

6. The transmitter of claim 5, wherein every second discrete line is referred to as an even discrete line, wherein every other discrete line is referred to as an odd discrete line, and wherein a first subset of frequency selective modulators sharing a first of the at least one drop bus waveguide modulate even discrete lines and a second subset of frequency selective modulators sharing a second of the at least one drop bus waveguide modulate odd discrete lines.

7. A transmitter according to claim 1, wherein at least one frequency selective modulator is a resonant ring modulator.

8. The transmitter of claim 1, wherein a frequency selective modulator comprises a modulator and a first add-drop multiplexer routing at least one discrete line from an input bus to the input of the modulator.

9. The transmitter of claim 8, wherein the frequency selective modulator further comprises a second add-drop multiplexer routing at least one modulated discrete line to a drop bus.

10. An optical link, comprising a transmitter according to claim 1.

11. A receiver for an optical link configured to decode at least one data stream from an optical signal transmitted by the transmitter according to claim 1, comprising a polarization splitting element with one input port and two output ports, at least one resonant add-drop multiplexer tuned to at least one line modulated according to a data stream, and at least one detector to convert a light intensity into an electrical signal, wherein light from the two output ports of the polarization splitting element is coupled into the resonant add-drop multiplexer in opposite directions, and that light is coupled from the resonant add-drop-multiplexer to the at least one detector in two opposite directions.

12. The receiver of claim 11, wherein optical path lengths between the polarization splitting element and the detector are substantially equal for both channel components of one and the same channel, wherein the channel corresponds to an optical carrier frequency and the channel components correspond to different polarization components.

13. The receiver according to claim 11, wherein multiple add-drop multiplexers are coupled to a common waveguide that forms part of an optical path between the two output ports of the polarization splitting element.

14. The receiver according to claim 13, wherein light from multiple add-drop multiplexers is coupled to the same detector or set of detectors.

15. The receiver according to claim 13, wherein the optical path between each of the output ports of the polarization splitting element and the add-drop multiplexers comprises at least one phase splitting element.

16. An optical link comprising a receiver according to claim 11.

* * * * *